US006939922B2

(12) United States Patent
Beckley et al.

(10) Patent No.: US 6,939,922 B2
(45) Date of Patent: Sep. 6, 2005

(54) COATING AND COATING COMPOSITION

(75) Inventors: Ronald Scott Beckley, Gilbertsville, PA (US); Robert Mitchell Blankenship, Harleysville, PA (US); Albert Benner Brown, Doylestown, PA (US); James Tinney Brown, Bechtelsville, PA (US); Shang-Jaw Chiou, Lower Gwynedd, PA (US); Anton Georges El A'mma, Perkiomenville, PA (US); Susan Jane Fitzwater, Ambler, PA (US); Robert Howard Gore, Southampton, PA (US); Eric Jon Langenmayr, Bryn Mawr, PA (US); Dennis Paul Lorah, Lansdale, PA (US); Warren Harvey Machleder, Blue Bell, PA (US); James Watson Neely, Dresher, PA (US); George Harvey Redlich, Norristown, PA (US); Curtis Schwartz, Ambler, PA (US); Frederick James Schindler, Ft. Washington, PA (US); Robert Victor Slone, Quakertown, PA (US); David William Whitman, Harleysville, PA (US); Mark Robert Winkle, Lansdale, PA (US)

(73) Assignee: ROHM and HAAS Company, Philadelphia, PA (US)

( * ) Notice: Subject to any disclaimer, the term of this patent is extended or adjusted under 35 U.S.C. 154(b) by 103 days.

(21) Appl. No.: 10/097,256

(22) Filed: Mar. 15, 2002

(65) Prior Publication Data

US 2003/0059599 A1 Mar. 27, 2003

Related U.S. Application Data

(60) Provisional application No. 60/280,297, filed on Mar. 30, 2001.

(51) Int. Cl.[7] ......................... C08F 120/02; C08F 20/02

(52) U.S. Cl. ................. 525/329.7; 525/185; 525/326.2; 525/326.5; 525/328.2; 525/328.9; 525/451; 526/317.1; 526/909

(58) Field of Search ............................. 525/329.7, 185; 428/402; 524/548, 804, 832, 845

(56) References Cited

U.S. PATENT DOCUMENTS

| | | | | | |
|---|---|---|---|---|---|
| 5,034,432 | A | | 7/1991 | Ueno et al. | 523/221 |
| 5,095,072 | A | * | 3/1992 | Kobayashi et al. | 525/199 |
| 5,756,573 | A | * | 5/1998 | Trumbo et al. | 524/458 |
| 5,874,111 | A | * | 2/1999 | Maitra et al. | 424/499 |
| 6,028,135 | A | * | 2/2000 | Keller et al. | 524/458 |
| 6,130,014 | A | * | 10/2000 | Yau et al. | 430/14 |
| 6,387,519 | B1 | | 5/2002 | Anderson et al. | 428/447 |
| 2002/0193521 | A1 | * | 12/2002 | Cruz et al. | 525/146 |
| 2003/0055178 | A1 | * | 3/2003 | Gore et al. | 525/242 |
| 2003/0059599 | A1 | * | 3/2003 | Beckley et al. | 428/327 |
| 2003/0232916 | A1 | * | 12/2003 | Lorah | 524/502 |

FOREIGN PATENT DOCUMENTS

| | | | | | |
|---|---|---|---|---|---|
| WO | WO 93/00376 | A1 | * | 1/1993 | C08F/220/10 |
| WO | WO 93/00376 | | | 7/1993 | C08F/220/10 |
| WO | WO 93/24534 | | | 12/1993 | |
| WO | WO 93/24534 | A1 | * | 12/1993 | C08F/2/24 |

* cited by examiner

*Primary Examiner*—David W. Wu
*Assistant Examiner*—Rip A. Lee
(74) *Attorney, Agent, or Firm*—Kim R. Jessum; Jeffrey H. Rosedale

(57) ABSTRACT

Provided are improved coatings, polymeric dispersions, and polymeric composites, which include crosslinked polymeric nanoparticles (hereafter "PNPs"). Also provided are methods for forming improved coatings, polymeric dispersions, and polymeric composites, which include PNPs. The PNPs have polymerized units of at least one multi-ethylenically-unsaturated monomer have a mean diameter of from 1 to 50 nanometers. PNPs having polymerized units of at least one multi-ethylenically-unsaturated monomer and at least one surface-active monomer are also provided.

10 Claims, No Drawings

COATING AND COATING COMPOSITION

CROSS REFERENCE TO RELATED PATENT APPLICATIONS

This is a non-provisional application of prior pending U.S. provisional application Ser. No. 60/280,297 filed Mar. 30, 2001.

This invention relates to an improved coating and an improved fluid coating composition. In particular, this invention relates to a dry coating including crosslinked polymeric nanoparticles (hereinafter "PNPs"), the dry coating having at least one of the following properties improved relative to that of a dry coating absent the PNPs: block resistance, print resistance, mar resistance, scrub resistance, burnish resistance, dirt pickup resistance, adhesion, gloss, flexibility, toughness, impact resistance, drying time, coalescent demand, water resistance, chemical resistance, biological fouling resistance, and stain resistance. This invention also relates to a fluid coating composition including PNPs, the fluid coating having at least one of the following properties improved relative to that of a fluid coating absent the PNPs: paint open time, rheology, and stability. This invention also relates to PNPs having surface active groups. This invention also relates to polymeric composites and polymeric dispersions containing PNPs. This invention also relates to methods for providing the improved coatings, fluid coating compositions, polymeric dispersions, and polymeric composites containing PNPs.

"Coatings" herein include compositions applied to various substrates and commonly identified as architectural coatings such as, for example, flat coatings, semigloss coatings, gloss coatings, primers, topcoats, stain-blocking coatings, penetrating sealers for porous substrates such as chalky surfaces, concrete, and marble, elastomeric coatings, mastics, caulks, and sealants; industrial coatings such as, for example, board and panelling coatings, transportation coatings, furniture coatings, and coil coatings; maintenance coatings such as, for example, bridge and tank coatings and road marking paints; leather coatings and treatments; floor care coatings; paper coatings; personal care coatings such as for hair, skin, nails, woven and nonwoven fabric coatings and pigment printing pastes; and adhesive coatings such as, for example, pressure sensitive adhesives and wet- and dry-laminating adhesives. Coatings having improvement in at least one property such as, for example, block resistance, print resistance, mar resistance, scrub resistance, burnish resistance, dirt pickup resistance, adhesion, gloss, flexibility, toughness, impact resistance, drying time, coalescent demand, water resistance, chemical resistance, and stain resistance have long been sought. "Coating compositions" and "fluid coating compositions" herein refer to compositions which when dried or allowed to dry, with or without the application of heat, after having been applied to a substrate form a coating. Coating compositions having improvement in at least one property such as, for example, desired rheology and thickener efficiency have also been sought.

WO 200075244 discloses binding agents formed by reacting one or more epoxide-functional binding agents with carboxyl functional metal-organic nanoparticles having a mean particle size of 5 to 200 nanometers.

It is desired to provide coatings and coatings compositions with at least one improved property as described herein. It has now been found that such improvements are provided in coating compositions and in coatings formed from coating compositions which include PNPs having a mean diameter of 1 to 50 nanometers, the PNPs comprising as polymerized units at least one multi-ethylenically-unsaturated monomer.

In a first aspect of the present invention there is provided an improved coating, including a coating, and PNPs having a mean diameter of 1 to 50 nanometers, said PNPs comprising as polymerized units at least one multi-ethylenically-unsaturated monomer.

In a second aspect of the present invention there is provided a method for providing an improved coating, including the steps of: forming PNPs having a mean diameter of 1 to 50 nanometers, said PNPs comprising as polymerized units at least one multi-ethylenically-unsaturated monomer; and forming a coating composition comprising said PNPs.

In a third aspect of the present invention there is provided a method for forming a polymeric dispersion, including the steps of: forming PNPs having a mean diameter of 1 to 50 nanometers, said PNPs comprising as polymerized units at least one multi-ethylenically-unsaturated monomer; providing a reaction mixture comprising said PNPs and at least one ethylenically unsaturated monomer; and subjecting said reaction mixture to at least one bulk, solution, gas-phase, emulsion, mini-emulsion, or suspension polymerization condition.

In a fourth aspect of the present invention there is provided a PNP, including polymerized units of at least one multi-ethylenically-unsaturated monomer and at least one surface-active monomer, said PNP having a mean diameter of from 1 to 50 nanometers.

In a fifth aspect of the present invention, there is provided a polymeric composite, including: PNPs having a mean diameter of 1 to 50 nanometers, said PNPs comprising as polymerized units at least one multi-ethylenically-unsaturated monomer; and polymers comprising as polymerized units at least one ethylenically-unsaturated monomer.

As used herein, the term "dispersion" refers to a physical state of matter comprising at least two distinct phases wherein one phase is distributed in the second phase, the second phase being continuous.

As used herein, the term "molecular weight", when describing the PNPs, refers to the apparent molecular weight one obtains using standard gel permeation chromatography methods, e.g., using THF solvent at 40 C, 3 Plgel Columns (Polymer Labs), 100 Angstrom, 10^3, 10^4 Angstroms, 30 cm long, 7.8 mm ID, 1 mil/min, 100 microliter injection volume, calibrated to narrow polystyrene standards using Polymer Labs CALIBRE™ software.

As used herein, the term "Tg" refers to the glass transition temperature as is determined using differential scanning calorimetry ("DSC") methods.

As used herein, the following abbreviations shall have the following meanings, unless the context clearly indicates otherwise: C=centigrade; μm=micron; UV=ultraviolet; rpm=revolutions per minute; nm=nanometer; J=joules; cc=cubic centimeter; g=gram; wt %=weight percent; L=liter; mL=milliliter; MIAK=methyl iso-amyl ketone; MIBK=methyl iso-butyl ketone; BA=butyl acrylate; AA=acrylic acid; MAA=methacrylic acid; PS=particle size=mean particle diameter; PMA=poly(methyl acrylate); CyHMA=cyclohexylmethacrylate; EG=ethylene glycol; DPG=dipropylene glycol; DEA=diethylene glycol ethyl ether acetate; BzA=benzylacrylate; BzMA=benzyl methacrylate; MAPS=MATS=(trimethoxylsilyl) propylmethacrylate; OFPMA=octafluoropentyl methacrylate; ropyl methacrylate; PETTA=pentaerythriol tetra/ triacetate; PPG4000DMA=polypropyleneglycol 4000 dimethacrylate; DPEPA=dipentaerythriol pentaacrylate; TMSMA=trimethylsilyl methacrylate; MOPTSOMS=methacryloxypropylbis(trimethylsiloxy)methylsilane; MOPMDMOS=3-methacryloxypropylmethyldimethoxysilane; TAT=triallyl-1,3,5-triazine-2,4,6-(1H,3H,5H)-trione; IBOMA=isobornyl methacrylate; PGMEA=propyleneglycol monomethylether acetate; PEGMEMA475=poly(ethylene glycol methyl ether)methacrylate Mw=475; EUG=eugenol (4-allyl-2-methoxyphenol); and PGDMA=propyleneglycol dimethacrylate.

The term "(meth)acrylic" includes both acrylic and methacrylic and the term "(meth)acrylate" includes both acrylate and methacrylate. Likewise, the term "(meth)acrylamide" refers to both acrylamide and methacrylamide. "Alkyl" includes straight chain, branched and cyclic alkyl groups.

All ranges defined herein are inclusive and combinable.

The present invention is directed to coating compositions, coatings formed from coating compositions, polymeric dispersions, and polymeric composites which include PNPs, the PNPs having polymerized units of at least one multi-ethylenically-unsaturated monomer, said PNPs having a mean diameter of from 1 to 50 nanometers, and methods for forming the same. The present invention is also directed to PNPs having polymerized units of at least one multi-ethylenically-unsaturated monomer and at least one surface-active monomer, said PNP having a mean diameter of from 1 to 50 nanometers.

While the PNPs used in the various embodiments of the present invention typically have a mean particle diameter of from 1 to 50 nanometers, they preferably have a mean particle diameter of from 1 to 40 nm, more preferably from 1 nm to 30 nm, even more preferably from 1 nm to 20 nm, even further preferably from 1 to 10 nm, and most preferably from 2 nm to 8 nm.

The PNPs are formed by the free radical polymerization of at least one multi-ethylenically-unsaturated monomer. Typically, unless specified otherwise, the PNPs contain at least 1% by weight based on the weight of the PNPs, of at least one polymerized multi-ethylenically-unsaturated monomer. Up to and including 100% polymerized multi-ethylenically-unsaturated monomer, based on the weight of the PNPs, can be effectively used in the particles of the present invention. It is preferred that the amount of polymerized multi-ethylenically-unsaturated monomer is from 1% to 80% based on the weight of the PNPs, more preferably from 1% to 60% based on the weight of the PNPs, and most preferably from 1% to 25% based on the weight of the PNPs.

Suitable multi-ethylenically-unsaturated monomers useful in the present invention include di-, tri-, tetra-, or higher multi-functional ethylenically unsaturated monomers such as, for example, trivinylbenzene, divinyltoluene, divinylpyridine, divinylnaphthalene and divinylxylene; and such as ethyleneglycol diacrylate, trimethylolpropane triacrylate, diethyleneglycol divinyl ether, trivinylcyclohexane, allyl methacrylate ("ALMA"), ethyleneglycol dimethacrylate ("EGDMA"), diethyleneglycol dimethacrylate ("DEGDMA"), propyleneglycol dimethacrylate, propyleneglycol diacrylate, trimethylolpropane trimethacrylate ("TMPTMA"), divinyl benzene ("DVB"), 2,2-dimethylpropane-1,3-diacrylate, 1,3-butylene glycol diacrylate, 1,3-butylene glycol dimethacrylate, 1,4-butanediol diacrylate, diethylene glycol diacrylate, diethylene glycol dimethacrylate, 1,6-hexanediol diacrylate, 1,6-hexanediol dimethacrylate, tripropylene glycol diacrylate, triethylene glycol dimethacrylate, tetraethylene glycol diacrylate, polyethylene glycol 200 diacrylate, tetraethylene glycol dimethacrylate, polyethylene glycol dimethacrylate, ethoxylated bisphenol A diacrylate, ethoxylated bisphenol A dimethacrylate, polyethylene glycol 600 dimethacrylate, poly(butanediol) diacrylate, pentaerythritol triacrylate, trimethylolpropane triethoxy triacrylate, glyceryl propoxy triacrylate, pentaerythritol tetraacrylate, pentaerythritol tetramethacrylate, dipentaerythritol monohydroxypentaacrylate, divinyl silane, trivinyl silane, dimethyl divinyl silane, divinyl methyl silane, methyl trivinyl silane, diphenyl divinyl silane, divinyl phenyl silane, trivinyl phenyl silane, divinyl methyl phenyl silane, tetravinyl silane, dimethyl vinyl disiloxane, poly(methyl vinyl siloxane), poly(vinyl hydro siloxane), poly (phenyl vinyl siloxane) and mixtures thereof.

Suitable ethylenically-unsaturated monomers which can be incorporated as copolymerized units in the PNPs include, but are not limited to: (meth)acrylic acid, (meth) acrylamides, alkyl (meth)acrylates, vinyl acetates, alkenyl (meth)acrylates, aromatic (meth)acrylates, vinyl aromatic monomers, nitrogen-containing compounds and their thio-analogs, phosphorus-containing compounds such as phosphoethyl (meth)acrylate ("PEM"), and substituted ethylene monomers.

Typically, the alkyl (meth)acrylates useful in the present invention are ($C_1$–$C_{24}$) alkyl (meth)acrylates. Suitable alkyl (meth)acrylates include, but are not limited to, "low cut" alkyl (meth)acrylates, "mid cut" alkyl (meth)acrylates and "high cut" alkyl (meth)acrylates.

"Low cut" alkyl (meth)acrylates are typically those where the alkyl group contains from 1 to 6 carbon atoms. Suitable low cut alkyl (meth)acrylates include, but are not limited to: methyl methacrylate ("MMA"), methyl acrylate, ethyl acrylate, propyl methacrylate, butyl methacrylate ("BMA"), butyl acrylate ("BA"), isobutyl methacrylate ("IBMA"), hexyl methacrylate, cyclohexyl methacrylate, cyclohexyl acrylate and mixtures thereof.

"Mid cut" alkyl (meth)acrylates are typically those where the alkyl group contains from 7 to 15 carbon atoms. Suitable mid cut alkyl (meth)acrylates include, but are not limited to: 2-ethylhexyl acrylate ("EHA"), 2-ethylhexyl methacrylate, octyl methacrylate, decyl methacrylate, isodecyl methacrylate ("IDMA", based on branched ($C_{10}$)alkyl isomer mixture), undecyl methacrylate, dodecyl methacrylate (also known as lauryl methacrylate), tridecyl methacrylate, tetradecyl methacrylate (also known as myristyl methacrylate), pentadecyl methacrylate and mixtures thereof. Useful mixtures include dodecyl-pentadecyl methacrylate ("DPMA"), a mixture of linear and branched isomers of dodecyl, tridecyl, tetradecyl and pentadecyl methacrylates; and lauryl-myristyl methacrylate ("LMA").

"High cut" alkyl (meth)acrylates are typically those where the alkyl group contains from 16 to 24 carbon atoms. Suitable high cut alkyl (meth)acrylates include, but are not limited to: hexadecyl methacrylate, heptadecyl methacrylate, octadecyl methacrylate, nonadecyl methacrylate, cosyl methacrylate, eicosyl methacrylate and mixtures thereof. Useful mixtures of high cut alkyl (meth) acrylates include, but are not limited to: cetyl-eicosyl methacrylate ("CEMA"), which is a mixture of hexadecyl, octadecyl, cosyl and eicosyl methacrylate; and cetyl-stearyl methacrylate ("SMA"), which is a mixture of hexadecyl and octadecyl methacrylate.

The mid-cut and high-cut alkyl (meth)acrylate monomers described above are generally prepared by standard esterification procedures using technical grades of long chain aliphatic alcohols, and these commercially available alcohols are mixtures of alcohols of varying chain lengths containing between 10 and 15 or 16 and 20 carbon atoms in the alkyl group. Examples of these alcohols are the various Ziegler catalyzed ALFOL alcohols from Vista Chemical (now Sasol) company, i.e., ALFOL 1618 and ALFOL 1620, Ziegler catalyzed various NEODOL alcohols from Shell Chemical Company, i.e. NEODOL 25L, and naturally derived alcohols such as Proctor & Gamble's TA-1618 and CO-1270. Consequently, for the purposes of this invention, alkyl (meth)acrylate is intended to include not only the individual alkyl (meth)acrylate product named, but also to include mixtures of the alkyl (meth)acrylates with a predominant amount of the particular alkyl (meth)acrylate named.

The alkyl (meth)acrylate monomers useful in the present invention can be a single monomer or a mixture having different numbers of carbon atoms in the alkyl portion. Also, the (meth)acrylamide and alkyl (meth)acrylate monomers useful in the present invention can optionally be substituted. Suitable optionally substituted (meth)acrylamide and alkyl (meth)acrylate monomers include, but are not limited to: hydroxy ($C_2$–$C_6$)alkyl (meth)acrylates, dialkylamino ($C_2$–$C_6$)-alkyl (meth)acrylates, dialkylamino($C_2$–$C_6$)alkyl (meth)acrylamides.

Useful substituted alkyl (meth)acrylate monomers are those with one or more hydroxyl groups in the alkyl radical, especially those where the hydroxyl group is found at the β-position (2-position) in the alkyl radical. Hydroxyalkyl (meth)acrylate monomers in which the substituted alkyl group is a ($C_2$–$C_6$)alkyl, branched or unbranched, are preferred. Suitable hydroxyalkyl (meth)acrylate monomers include, but are not limited to: 2-hydroxyethyl methacrylate ("HEMA"), 2-hydroxyethyl acrylate ("HEA"), 2-hydroxypropyl methacrylate, 1-methyl-2-hydroxyethyl methacrylate, 2-hydroxypropyl acrylate, 1-methyl-2-hydroxyethyl acrylate, 2-hydroxybutyl methacrylate, 2-hydroxybutyl acrylate and mixtures thereof. The preferred hydroxyalkyl (meth)acrylate monomers are HEMA, 1-methyl-2-hydroxyethyl methacrylate, 2-hydroxypropyl methacrylate and mixtures thereof. A mixture of the latter two monomers is commonly referred to as "hydroxypropyl methacrylate" or "HPMA."

Other substituted (meth)acrylate and (meth)acrylamide monomers useful in the present invention are those with a dialkylamino group or dialkylaminoalkyl group in the alkyl radical. Examples of such substituted (meth)acrylates and (meth)acrylamides include, but are not limited to: dimethylaminoethyl methacrylate, dimethylaminoethyl acrylate, N,N-dimethylaminoethyl methacrylamide, N,N-dimethylaminopropyl methacrylamide, N,N-dimethylaminobutyl methacrylamide, N,N-diethylaminoethyl methacrylamide, N,N-diethylaminopropyl methacrylamide, N,N-diethylaminobutyl methacrylamide, N-(1,1-dimethyl-3-oxobutyl) acrylamide, N-(1,3-diphenyl-1-ethyl-3-oxobutyl) acrylamide, N-(1-methyl-1-phenyl-3-oxobutyl) methacrylamide, and 2-hydroxyethyl acrylamide, N-methacrylamide of aminoethyl ethylene urea, N-methacryloxy ethyl morpholine, N-maleimide of dimethylaminopropylamine and mixtures thereof.

Other substituted (meth)acrylate monomers useful in the present invention are silicon-containing monomers such as γ-propyl tri($C_1$–$C_6$)alkoxysilyl (meth)acrylate, γ-propyl tri ($C_1$–$C_6$)alkylsilyl (meth)acrylate, γ-propyl di($C_1$–$C_6$)alkoxy ($C_1$–$C_6$)alkylsilyl (meth)acrylate, y-propyl di($C_1$–$C_6$)alkyl ($C_1$–$C_6$)alkoxysilyl (meth)acrylate, vinyl tri($C_1$–$C_6$) alkoxysilyl (meth)acrylate, vinyl di($C_1$–$C_6$)alkoxy($C_1$–$C_6$) alkylsilyl (meth)acrylate, vinyl ($C_1$–$C_6$)alkoxydi($C_1$–$C_6$) alkylsilyl (meth)acrylate, vinyl tri($C_1$–$C_6$)alkylsilyl (meth) acrylate, and mixtures thereof.

The vinylaromatic monomers useful as unsaturated monomers in the present invention include, but are not limited to: styrene ("STY"), α-methylstyrene, vinyltoluene, p-methylstyrene, ethylvinylbenzene, vinylnaphthalene, vinylxylenes, and mixtures thereof. The vinylaromatic monomers also include their corresponding substituted counterparts, such as halogenated derivatives, i.e., containing one or more halogen groups, such as fluorine, chlorine or bromine; and nitro, cyano, ($C_1$–$C_{10}$)alkoxy, halo($C_1$–$C_{10}$) alkyl, carb($C_1$–$C_{10}$)alkoxy, carboxy, amino, ($C_1$–$C_{10}$) alkylamino derivatives and the like.

The nitrogen-containing compounds and their thio-analogs useful as unsaturated monomers in the present invention include, but are not limited to: vinylpyridines such as 2-vinylpyridine or 4-vinylpyridine; lower alkyl ($C_1$–$C_8$) substituted N-vinyl pyridines such as 2-methyl-5-vinyl-pyridine, 2-ethyl-5-vinylpyridine, 3-methyl-5-vinylpyridine, 2,3-dimethyl-5-vinyl-pyridine, and 2-methyl-3-ethyl-5-vinylpyridine; methyl-substituted quinolines and isoquinolines; N-vinylcaprolactam; N-vinylbutyrolactam; N-vinylpyrrolidone; vinyl imidazole; N-vinyl carbazole; N-vinyl-succinimide; (meth)acrylonitrile; o-, m-, or p-aminostyrene; maleimide; N-vinyl-oxazolidone; N,N-dimethyl aminoethyl-vinyl-ether; ethyl-2-cyano acrylate; vinyl acetonitrile; N-vinylphthalimide; N-vinyl-pyrrolidones such as N-vinyl-thio-pyrrolidone, 3 methyl-1-vinyl-pyrrolidone, 4-methyl-1-vinyl-pyrrolidone, 5-methyl-1-vinyl-pyrrolidone, 3-ethyl-1-vinyl-pyrrolidone, 3-butyl-1-vinyl-pyrrolidone, 3,3-dimethyl-1-vinyl-pyrrolidone, 4,5-dimethyl-1-vinyl-pyrrolidone, 5,5-dimethyl-1-vinyl-pyrrolidone, 3,3,5-trimethyl-1-vinyl-pyrrolidone, 4-ethyl-1-vinyl-pyrrolidone, 5-methyl-5-ethyl-1-vinyl-pyrrolidone and 3,4,5-trimethyl-1-vinyl-pyrrolidone; vinyl pyrroles; vinyl anilines; vinyl versatates; and vinyl piperidines.

The substituted ethylene monomers useful as unsaturated monomers in the present invention include, but are not limited to: allylic monomers, vinyl acetate, vinyl formamide, vinyl chloride, vinyl fluoride, vinyl bromide, vinylidene chloride, vinylidene fluoride and vinylidene bromide.

The PNPs used in the present invention can be prepared by emulsion polymerization, mini-emulsion, micro-emulsion, suspension polymerization, non-aqueous dispersion polymerization, or solution polymerization. By "solution polymerization" herein is meant free radical addition polymerization in an aqueous or nonaqueous medium which is a solvent for the polymer. By "solvent for the polymer" herein is meant that the polymer absent crosslinking would be soluble in the polymerization medium, as can be predicted based on the solubility of a polymer made under the same conditions absent the crosslinking monomer for polymers containing less than about 20 wt. % multi-ethylenically unsaturated monomer or by selection of a polymerization medium based on solubility maps as disclosed herein.

The PNPs can be prepared in a non-aqueous solvent. Examples of such solvents include, but are not limited to: hydrocarbons, such as alkanes, fluorinated hydrocarbons, and aromatic hydrocarbons, ethers, ketones, esters, alcohols and mixtures thereof. Particularly suitable solvents include dodecane, mesitylene, xylenes, diphenyl ether, gamma-butyrolactone, ethyl acetate, ethyl lactate, propyleneglycol monomethyl ether acetate, caprolactone, 2-heptanone, methylisobutyl ketone, diisobutylketone, propyleneglycol monomethyl ether, and alkyl-alcohols, such as decanol, t-butanol, and isopropanol ("IPA").

The PNPs can be prepared by first charging a solvent heel or, alternatively, a mixture of solvent and some portion of the monomer(s) to a reaction vessel equipped with a stirrer, a thermometer and a reflux condenser. The monomer charge is typically composed of monomer(s), initiator and chain transfer agent, as appropriate. The solvent or solvent/monomer heel charge is heated with stirring under a nitrogen blanket to a temperature from about 55° C. to about 125° C. After the heel charge has reached a temperature sufficient to initiate polymerization, the monomer charge or balance of the monomer charge is added to the reaction vessel over a period of 15 minutes to 4 hours while maintaining the reaction at the desired reaction temperature. After completing the monomer mixture addition, additional initiator in solvent can be charged to the reaction and/or hold periods can be employed.

The PNPs can be prepared by emulsion polymerization. The emulsion polymers useful in the present invention are generally prepared by first charging water and some portion of the monomer emulsion to a reaction vessel equipped with a stirrer, a thermometer and a reflux condenser. Typically, the monomer emulsion is composed of monomer, surfactant, initiator and chain transfer agent, as appropriate. The initial charge of monomer emulsion is added to a suitable reactor vessel that is heated with stirring under a nitrogen blanket to a temperature of from about 55° C. to about 125° C. After the seed charge has reached a temperature sufficient to initiate polymerization, the monomer emulsion or balance of the monomer emulsion is charged to the reaction vessel over a period of 15 minutes to 4 hours while maintaining the reaction at the desired reaction temperature. After completing the monomer emulsion addition, additional initiator can be charged to the reaction and/or hold periods can be employed.

In the alternative, the emulsion polymerization can be carried out in a batch process. In such a batch process, the emulsion polymers are prepared by charging water, monomer, surfactant, initiator and chain transfer agent, as appropriate, to a reaction vessel with stirring under a nitrogen blanket. The monomer emulsion is heated to a temperature of from about 55° C. to about 125° C. to carry out the polymerization. After completing the monomer emulsion addition, additional initiator in solvent can be charged to the reaction and/or hold periods can be employed.

Suitable PNPs include, for example: HEMA/DEGDMA, MMA/DEGDMA, MMA/MAPS/DEGDMA, MMA/MAPS/PETTA, MMA/MAPS/PPG4000DMA, MMA/MAPS/DPEPA, MAPS/DEGDMA, BA/DEGDMA, MMA/MAPS/TMPTMA, MMA/MAPS/DVB, STY/MAPS/DVB, BA/MAPS/DVB, BA/TMSMA/DVB, BA/MOPTSOMS/DVB, BA/MOPMDMOS/DVB, BA/MAPS/TAT, ALMA/BA/DVB, IBOMA/MAPS/DVB, IBOA/MAPS/DVB, BA/DVB, BA/PGDMA, BA/ALMA, BA/TMPTMA, BA/DPEPA, EHA/DVB, EHA/ALMA, EHA/TMPTMA, EHA/DPEPA, STY/DVB, STY/ALMA, EHA/STY/ALMA, MMA/BA/ALMA, STY/MMA/DVB, MMA/butadiene/STY, MMA/EA/ALMA, BA/ALMA/MATS, STY/MATS/DVB, MMA/BA/MATS, STY/MMA/MATS/DVB, MMA/BA/MATS/ALMA, BzA/TMPTMA, BzA/DVB, IDMA/BzMA and MMA/ALMA/MATS.

Control of particle size and distribution can be achieved by such methods as choice of solvent, choice of initiator, total solids level, initiator level, type and amount of multi-functional monomer, type and amount of chain transfer agent, and reaction conditions. Particle sizes (mean particle diameter) can be determined using standard dynamic light scattering techniques, wherein the correlation functions can be converted to hydrodynamic sizes using LaPlace inversion methods, such as CONTIN.

Initiators useful in the free radical polymerization of the present invention include, for example, one or more of: peroxyesters, dialkylperoxides, alkylhydroperoxides, persulfates, azoinitiators, redox initiators and the like. Useful free radical initiators include, but are not limited to: benzoyl peroxide, t-butyl peroctoate, t-amyl peroxypivalate, cumene hydroperoxide, and azo compounds such as azoisobutylnitrile and 2,2'-azo bis (2-methylbutanenitrile). It is preferred that the free radical initiator is t-amyl peroxypivalate. The amount of the free radical initiator used is typically from 0.05 to 10% by weight, based on the weight of total monomer.

Chain transfer reagents can optionally be used to prepare the polymers useful in the present invention. Suitable chain transfer agents include, for example: alkyl mercaptans such as dodecyl mercaptan, and aromatic hydrocarbons with activated hydrogens such as toluene.

The PNPs typically have an "apparent weight average molecular weight" in the range of 5,000 to 1,000,000, preferably in the range of 10,000 to 500,000 and more preferably in the range of 15,000 to 100,000. As used herein, "apparent weight average molecular weight" reflects the size of the PNP particles. The GPC elution times of the PNPs thereby provide an indication of an apparent weight average molecular weight measurement, and not necessarily an absolute weight average molecular weight measurement.

The PNPs can also be post-functionalized. Such post-functionalization can be by any technique known in the art. Post-polymerization functionalization of the PNPs can be advantageous, such as in compatiblizing the PNPs with other components in the coating composition.

The PNPs are desirably discrete or unagglomerated and dispersible, miscible or otherwise substantially compatible with/in the coating composition in the fluid state and in the dried coating.

The compatibility of the PNPs with the balance of the coating composition is typically determined by matching their solubility parameters, such as the Van Krevelen parameters of delta d, delta p, delta h and delta v. See, for example, Van Krevelen et al., *Properties of Polymers. Their Estimation and Correlation with Chemical Structure*, Elsevier Scientific Publishing Co., 1976; Olabisi et al., *Polymer-Polymer Miscibility*, Academic Press, NY, 1979; Coleman et al., *Specific Interactions and the Miscibility of Polymer Blends*, Technomic, 1991; and A. F. M. Barton, *CRC Handbook of Solubility Parameters and Other Cohesion Parameters*, $2^{nd}$ Ed., CRC Press, 1991. Delta d is a measure of dispersive interactions, delta p is a measure of polar interactions, delta h is a measure of hydrogen bonding interactions, and delta v is a measure of both dispersive and polar interactions. Such solubility parameters can either be calculated, such as by the group contribution method, or determined by measuring the cloud point of a polymeric material in a mixed solvent system consisting of a soluble solvent and an insoluble solvent. The solubility parameter at the cloud point is based on the weighted percentage of the solvents. Typically, a number of cloud points are measured for the material and the central area defined by such cloud points is defined as the area (range) of solubility parameters of the material.

In certain embodiments of the present invention, the solubility parameters of the PNP and coating composition medium can be substantially similar. In these embodiments, compatibility between the PNP in/with the coating composition is improved and phase separation and/or aggregation of the PNP in the coating is less likely to occur. It is preferred that the solubility parameters, particularly delta h and delta v, of the PNP and coating composition medium are substantially matched. It will be appreciated by those skilled in the art that other properties of the PNP besides the solubility parameters also affect the compatibility of PNPs in coatings.

The PNPs can be used as a dispersion in the polymerization solvent or they can be isolated by, for example, vacuum evaporation, by precipitation into a non-solvent, and spray drying. When isolated, PNPs can be subsequently redispersed in a medium appropriate for incorporation into a coating composition.

The PNPs can be incorporated into a coating composition by admixing the PNPs or a dispersion of the PNPs with other dissolved or dispersed polymers and/or other coatings adjuvants as are well known to those skilled in the art. The coating composition can include an aqueous or non-aqueous medium. The coating composition can contain conventional coating adjuvants such as, for example, tackifiers, pigments, emulsifiers, crosslinkers, monomers, oligomers, polymers, solvents, coalescing agents, buffers, neutralizers, thickeners or rheology modifiers, humectants, wetting agents, biocides, plasticizers, antifoaming agents, colorants, waxes, and antioxidants.

The solids content of the improved coatings of the present invention can be from about 10% to about 85% by volume. Among aqueous coatings, the viscosity is typically from 0.05 to 2000 Pa.s (50 cps to 2,000,000 cps), as measured using a Brookfield viscometer; the viscosities appropriate for different end uses and application methods vary considerably.

The coating can applied by conventional application methods such as, for example, brush or paint roller, air-atomized spray, air-assisted spray, airless spray, high volume low pressure spray, air-assisted airless spray, curtain coating, roller coating, reverse roller coating, gravure coating, flexography, ink-jet, bubble-jet, and electrostatic spray.

The coating can be applied to a substrate such as, for example, plastic including sheets and films, wood, metal, leather, woven or nonwoven fabric, hair, skin, nails, paper, previously painted surfaces, cementitious substrates, and asphaltic substrates, with or without a prior substrate treatment such as a primer.

The coating on the substrate is typically dried, or allowed to dry, at temperatures from 10° C. to 200° C.

Coatings having at least one of the following improved properties: block resistance, print resistance, mar resistance, scrub resistance, burnish resistance, dirt pickup resistance, toughness, water resistance, chemical resistance, and stain resistance, relative to the same composition absent the PNPs, can be provided by ensuring that the PNPs are characteristically hard. Hard PNPs can be provided by providing crosslinking higher than required by the overall invention (i.e., greater than 5, preferably greater than 10, more preferably greater than 15, and even more preferably greater than 20 weight percent of at least one multi-ethylenically-unsaturated monomer used to prepare the PNPs) when the Tg is less than ambient temperatures. Alternatively, hard PNPs can be provided by provided that the PNP Tg is greater than ambient (i.e., greater than 25 C, preferably greater than 50 C, more preferably greater than 100 C) by utilizing monomers that yield high Tg polymers (e.g., methacrylic and vinyl aromatic monomers). Preferably, hard PNPs incorporate a combination of both high crosslinking and monomers that yield high Tg polymers to provide sufficiently high hardness for improving coating properties.

Coatings having improved water resistance relative to the same composition absent the PNPs, can also be provided by ensuring that the PNPs are characteristically hydrophobic. Hydrophobic PNPs can be provided by ensuring that the weight percentage of polymerized units of the PNPs derived from hydrophobic monomers, based on total PNP weight, is at least 20 weight percent, preferably at least 40 weight percent, more preferably at least 50 weight percent, even more preferably at least 70 weight percent, and most preferably at least 80 weight percent. Hydrophobic monomers useful in the present embodiment will typically have a water solubility (or weight average water solubility for hydrophobic monomer mixtures) of less than 10, preferably less than 5, more preferably less than 2, and further preferably less than 1 percent at 25° C. By "water solubility" herein is meant, the solubility in water at 25 C. By "weight-averaged water solubility" herein is meant that when more than one second monomer is selected the water solubility is calculated by adding, for each second monomer, the product of its water solubility and its weight fraction based on the total weight of the second monomers. The solubility of monomers in water is known. For example, data are available in "Polymer Handbook" (Second edition, J. Brandrup, E. H. Immergut, Editors, John Wiley & Sons) and "Merck Index" (Eleventh Edition, Merck & Co., Inc. (Rahway, N.J., U.S.A.). Data for typical monomers are shown below

| Monomer | Solubility in water (%, 25° C.) |
|---|---|
| Methyl methacrylate | 1.35 |
| Ethyl methacrylate | 0.46 |
| Butyl methacrylate | 0.03 |
| Ethyl acrylate | 2.0 (20 C.) |
| 2-Ethylhexyl acrylate | 0.01 |
| 2-Hydroxyethyl methacrylate | complete |
| Styrene | 0.029 |
| Acrylonitrile | 7.30 |
| Vinyl acetate | 2.3 |
| Acrylamide | 20.4. |

In one embodiment of the present invention, a coating containing a polymer dissolved in a solvent for the polymer is admixed with PNPs, the PNPs having a glass transition temperature higher than that of the polymer. The coating formed from the coating composition exhibits at least one improved property from block resistance, print resistance, mar resistance, scrub resistance, burnish resistance, dirt pickup resistance, toughness, water resistance, chemical resistance, and stain resistance relative to the same composition absent the PNPs.

In one embodiment of the present invention, a coating containing an alkyd dissolved in a solvent for the alkyd is admixed with PNPs having a glass transition temperature higher than that of the polymer. The coating formed from the coating composition exhibits at least one improved property from drying time, block resistance, print resistance, mar resistance, scrub resistance, burnish resistance, dirt pickup resistance, toughness, water resistance, chemical resistance, and stain resistance relative to the same composition absent the PNPs.

In one embodiment of the present invention, a coating containing a polymer dissolved in a solvent for the polymer is admixed with PNPs having a glass transition temperature lower than that of the polymer. The coating formed from the coating composition exhibits at least one improved property from scrub resistance, toughness, flexibility, water resistance, chemical resistance, and stain resistance relative to the same composition absent the PNPs.

In one embodiment of the present invention, an aqueous coating containing a polymer dispersed in an aqueous medium, such as an emulsion polymer, having a particle size greater than 50 nanometers is admixed with PNPs having a glass transition temperature higher than that of the polymer. The dry coating formed from the coating composition exhibits at least one improved property from block resistance, print resistance, mar resistance, scrub resistance, burnish resistance, dirt pickup resistance, toughness, drying time, water resistance, chemical resistance, and stain resistance relative to the same composition absent the PNPs.

In one embodiment of the present invention, an aqueous coating containing a polymer dispersed in an aqueous medium such as an emulsion polymer having a particle size greater than 50 nanometers is prepared in the presence of PNPs. The polymers dispersed in an aqueous medium can be prepared by various polymerization methods, such as emulsion polymerization, mini-emulsion, micro-emulsion, suspension polymerization, non-aqueous dispersion polymerization, or solution polymerization. The dry coating formed from the coating composition exhibits at least one improved property from block resistance, print resistance, mar resistance, scrub resistance, burnish resistance, dirt pickup resistance, toughness, drying time, water resistance, chemical resistance, and stain resistance relative to the same composition absent the PNPs.

In one embodiment of the present invention, a coating containing a polymer dispersed in an aqueous medium such as an emulsion polymer is admixed with PNPs having a glass transition temperature lower than that of the polymer. The dry coating formed from the coating composition exhibits at least one improved property from scrub resistance, block resistance, dirt pickup resistance, toughness, flexibility, water resistance, chemical resistance, and stain resistance relative to the same composition absent the PNPs.

In one embodiment of the present invention a coating containing a polymer dispersed in an aqueous medium such as an emulsion polymer is admixed with PNPs, the PNPs being provided as a dispersion in a solvent which is a coalescent for the emulsion polymer. The dry coating formed from the coating composition exhibits at least one improved property from scrub resistance, toughness, flexibility, coalescent demand, water resistance, chemical resistance, and stain resistance relative to the same composition absent the PNPs.

In one embodiment of the present invention, a coating including PNPs bearing a functional species, such as for example, an antioxidant or an optical brightener, is provided. For example, the functional species can be provided by a corresponding functional monomer introduced in the preparation of the PNP, by post reaction of a PNP, or by physical attachment such as adsorption, hydrogen bonding, etc. of an appropriate species to a PNP. The PNPs provide a more efficient use of the functional species relative to the coating absent the PNPs. The PNPs can also provide a more efficient use of the functional species relative to the coating wherein the functional species are attached to particles larger than 50 nm.

In one embodiment of the present invention a coating composition containing a polymer dispersed in an aqueous medium, such as an emulsion polymer, is admixed with PNPs having a composition including copolymerized fluoromonomers or silicone-containing monomers. The dry coating formed from the coating composition exhibits improved stain resistance, biological fouling resistance (e.g., mildew, microbial, and algae resistance), and chemical resistance relative to the same composition absent the PNPs.

In one embodiment of the present invention a coating composition containing a polymer dispersed in an aqueous medium such as an emulsion polymer is admixed with PNPs having a composition including at least one copolymerized aldehyde-reactive group-containing monomer. The dry coating formed from the coating composition exhibits improved adhesion to an alkyd relative to the same composition absent the PNPs.

By "aldehyde reactive group-containing monomer" is meant herein a monomer that, in a homogeneous solution containing 20% by weight of the monomer and an equimolar amount of formaldehyde at any pH from 1 to 14, will exhibit greater than 10% extent of reaction between the monomer and formaldehyde on a molar basis in one day at 25° C. Included as ethylenically-unsaturated aldehyde reactive group-containing monomers are, for example, vinyl acetoacetate, acetoacetoxyethyl (meth)acrylate, acetoacetoxypropyl (meth)acrylate, allyl acetoacetate, acetoacetoxybutyl (meth)acrylate, 2,3-di(acetoacetoxy)propyl (meth)acrylate, vinyl acetoacetamide, acetoacetoxyethyl (meth)acrylamide, 3-(2-vinyloxyethylamino)-propionamide, N-(2-(meth)acryloxyethyl)-morpholinone-2, 2-methyl-1-vinyl-2-imidazoline, 2-phenyl-1-vinyl-2-imidazoline, 2-(3-Oxazolidinyl)ethyl (meth)acrylate, N-(2-vinoxyethyl)-2-methyloxazolidine, 4,4-dimethyl-2-isopropenyloxazoline, 3-(4-pyridyl)propyl (meth)acrylate, 2-methyl-5-vinyl-pyridine, 2-vinoxyethylamine, 2-vinoxyethylethylene-diamine, 3-aminopropyl vinyl ether, 2-amino-2-methylpropyl vinyl ether, 2-aminobutyl vinyl ether, tert-butylaminoethyl (meth)acrylate, 2-(meth)acryloxyethyldimethyl-β-propiobetaine, diethanolamine monovinyl ether, o-aniline vinyl thioether, (meth)acryloxyacetamido-ethylethyleneurea, ethyleneureidoethyl (meth)acrylate, (meth)acrylamidoethyl-ethyleneurea, (meth)acrylamidoethyl-ethylenethiourea, N-((meth)acrylamidoethyl)-$N^1$-hydroxymethylethyleneurea, N-((meth)acrylamidoethyl)-$N^1$-methoxymethylethyleneurea, N-formamidoethyl-$N^1$-vinylethyleneurea, N-vinyl-$N^1$-aminoethyl-ethyleneurea, N-(ethyleneureidoethyl)-4-pentenamide, N-(ethylenethioureido-ethyl)-10-undecenamide, butyl ethyleneureido-ethyl fumarate, methyl ethyleneureido-ethyl fumarate, benzyl N-(ethyleneureido-ethyl) fumarate, benzyl N-(ethyleneureido-ethyl) maleamate, N-vinoxyethylethylene-urea, N-(ethyleneureidoethyl)-crotonamide, ureidopentyl vinyl ether, 2-ureidoethyl (meth) acrylate, N-2-(allylcarbamoto)aminoethyl imidazolidinone, 1-(2-((20hydroxy-3-(2-propenyloxy)propyl)amino)ethyl)-2-imidazolidinone, hydrogen ethyleneureidoethyl itaconamide, ethyleneureidoethyl hydrogen itaconate, bis-ethyleneureidoethyl itaconate, ethyleneureidoethyl undecylenate, ethyleneureidoethyl undecylenamide, 2-(3-methylolimidazolidone-2-yl-1)ethyl acrylate, N-acryloxyalkyl oxazolidines, acylamidoalkyl vinyl alkyleneureas, aldehyde-reactive amino group-containing monomers as dimethyaminoethyl methacrylate, and ethylenically unsaturated monomers containing aziridene functionality. PNPs prepared from the following aldehyde-reactive group-containing monomers are particularly preferred: 2-(2-oxo-1-imidazolidinyl)ethyl methacrylate, 1-[2-[[2-hydroxy-3-(2-propenyloxy)propyl]amino]ethyl]-2-imidazolidinone, 2-methyl-n-[2-(2-oxo-1-imidazolidinyl) ethyl] methacrylamide, 2-butenedioic acid, bis[2-(2-oxo-1-imidazolidinyl)ethyl] ester, carbamic acid, [2-(2-oxo-1-imidazolidinyl)ethyl]-, 2-propenyl ester, AAEM, and combinations thereof.

In this embodiment, the aldehyde-reactive groups can be introduced into the composition of the PNPs by synthesizing the PNPs with aldehyde-reactive group-containing monomers. For example, the aldehyde-reactive group-containing monomers can be included along with multi-ethylenically-unsaturated monomers and ethylenically-unsaturated monomers for preparing PNPs having aldehyde-reactive groups. Concentrations of the aldehyde-reactive group-containing monomers typically range from 1 percent to 99 percent, and more typically range from 5 percent to 90 percent, and even more typically range from 10 percent to 80 percent by weight based on the total weight of monomers.

PNPs prepared with aldehyde-reactive group-containing monomers ("aldehyde-reactive PNPs") are useful for improving the adhesion of the resulting films to substrates. For example, emulsion-based paints can be prepared from latex polymers and formulated with aldehyde-reactive PNPs. The aldehyde-reactive group-containing monomers can be added to a coatings formulation along with aldehyde-reactive PNPs for improving the adhesion of the coatings to substrates. As well, the polymerization of monomer emulsion lattices can be carried out in the presence of aldehyde-reactive PNPs. The concentration of the aldehyde-reactive PNPs in the coating formulation for increasing adhesion strength will typically be in the range of from 0.1 percent to 5 percent by weight, more typically in the range of from 0.2 percent to 4 percent by weight, and even more typically in the range of from 0.5 percent to 3 percent by weight, and most typically in the range of from 1 to 2 percent by weight.

In one embodiment, coatings containing a polymer dispersed in an aqueous medium, such as an anionic emulsion polymer, can be admixed with PNPs having a composition including at least one copolymerized drying-promoting monomer, and a sufficient amount of a volatile base to ensure that the PNP is in an unionized state. Examples of drying-promoting monomers include ethylenically unsaturated monomers which contain basic amine groups. Examples of such monomers containing basic amine groups are described in U.S. Pat. No. 5,527,823 and U.S. Pat. No. 5,804,627. Especially useful monomers include DMAEMA, DMAPMA, and OXEMA (2-(3-oxazolidinyl)ethyl methacrylate), and combinations thereof. Accordingly, "drying-promoting-PNPs" are useful for improving the drying or setting speed of coatings, especially anionic latex-based coatings.

In this embodiment, the drying-promoting groups can be introduced into the composition of PNPs by synthesizing the PNPs with drying-promoting functional monomers. Various drying-promoting functional monomers can be included along with multi-ethylenically-unsaturated monomers and optional other ethylenically-unsaturated monomers for preparing PNPs having drying-promoting groups. Concentrations of the drying-promoting functional monomers typically range from 1 percent to 99 percent, more typically range from 5 percent to 90 percent, and even more typically range from 10 percent to 80 percent by weight based on the total weight of monomers used to synthesize the PNPs. The concentration of the drying-promoting PNPs in the coating formulation is sufficient to reduce the drying time of the coating, which will typically be an amount between 20 percent and 500 percent, more typically between 50 percent and 250 percent, and even more typically between 75 and 150 percent based on the equivalents of anionic charge in the coating formulation.

In one embodiment of the present invention, a coating containing a polymer dissolved in a solvent is admixed with PNPs including at least one copolymerized surface-active monomers, such as fluoromonomers, silicon-containing monomers, or poly(alkylene-oxide)-containing monomers having poly(alkylene-oxide) segment molecular weights in the range of 100 to 5,000 g/mol (such as monomers including poly(ethylene oxide) segments), or mixtures thereof. In this embodiment, the weight percent of surface-active monomers used for preparing the PNPs is in the range of from 1 to 90%, preferably from 2 to 75%, more preferably from 5 to 50%, and even more preferably from 10 to 40%. PNPs containing fluorine, silicon, and poly(alkylene-oxide) groups can also be prepared by reacting PNPs containing reactive groups with fluorine, silicon, and poly(alkylene oxide) chemical moieties that chemically interact with the reactive groups of the PNPs. The dry coating formed from the coating composition exhibits improved resistance to the buildup of marine fouling organisms relative to the same composition absent the PNPs. While the Tg of the PNPs used in the present embodiment is not limited, in certain applications it is preferred that the Tg is less than 25 C, more preferably less than 0 C, and even more preferably less than −25 C for reducing the ability of marine fouling organisms to adhere to coating surfaces.

In one embodiment of the present invention, non-fouling/foulant releasing coatings are provide that may not require expensive, environmentally-detrimental biocides or silicone-based coatings. These coatings are provided by a coating composition which is admixed with crosslinked PNPs having a composition including copolymerized acid-containing monomers, such as (meth)acrylic acid, along with at least one fluoromonomers or silicone-containing monomer, or mixtures thereof, coating a substrate with said coating composition, curing or drying said coating, and attaching a poly(alkylene-oxide) molecule to said cured or dried coating. Attachment of poly(alkylene-oxide) molecules, especially poly(ethylene-oxide) ("PEO") molecules to the resulting coating provides a dramatic reduction in adsorption of biomolecules on these surface-modified substrates. Various methods of attaching PEO to substrates that can be applied in the present embodiment can be found in Ostuni, et al, *A Survey of Structure-Property Relationships of Surfaces that Resist the Adsorption of Protein*, Langmuir, 17, 5605–5620 (2001). The presence of acid in bulk matrix films, however, causes a reduction in film properties resulting from water uptake (i.e., water sensitivity). Accordingly, PNPs prepared with both surface active monomers (e.g., F and Si) and acid-containing monomers (e.g., MAA or AA) provide acid sites concentrated on the surface of the coating which are accessible for grafting, but which may not contribute to water sensitivity of the coating. In this embodiment, the weight percent of surface-active monomers used for preparing the PNPs is in the range of from 1 to 90%, preferably from 2 to 30%, more preferably from 5 to 25%, and even more preferably from 10 to 25%. In this embodiment, the weight percent of acid-containing monomers used for preparing the PNPs is in the range of from 1 to 90%, preferably from 2 to 30%, more preferably from 5 to 25%, and even more preferably from 10 to 25%.

While not being bound to a particular theory, the PNPs migrate to the cured or dried coating surface and present acid binding sites to the coating surface, which in turn are subsequently grafted with the poly(alkylene-oxide) composition, such as a poly(ethylene-oxide) ("PEO") composition to form a "PEO brush" which inhibits the deposition of protein on the coating surface. The resulting non-fouling/foul releasing coatings are durable, and easier to apply than present silicone based coatings and also exhibit improved resistance to the buildup of marine fouling organisms relative to the same composition absent the "PEO brush".

In one embodiment, the binder of non-fouling/foul releasing coatings can be low Tg, crosslinkable polymers to which PNPs containing both surface-active groups and acid-binding sites are admixed. While not being bound to a particular theory, the PNPs in such coatings may migrate to the air interface and provide graftable sites for subsequent surface treatments (e.g., PEO). In this embodiment, "low Tg" refers to Tg less than 25 C, preferably less than 0 C, more preferably less than −25 C.

In one embodiment of the present invention, PNPs are provided which have a mean diameter of 1 to 50 nanometers, preferably from 1 to 40 nm, more preferably from 1 to 30 nm, even more preferably from 1 to 20 nm, even further preferably from 1 to 10 nm, and most preferably from 2 to 8 nm, the PNPs having as polymerized units of at least one multi-ethylenically-unsaturated monomer and at least one surface-active monomer to form "surface-active PNPs". In an alternate embodiment, the surface active PNPs additionally contain polymerized units derived from an acid monomer. In another embodiment, the surface active PNPs additionally contain poly(alkylene oxide), preferably PEO. Poly (alkylene oxide) can be incoporated into the PNPs as described above. These PNPs can be useful in preparing a variety of materials and coatings used in the architectural, electronic, and transportation fields. For example, surface-active PNPs containing poly(alkylene oxide) can be useful for improving resistance to biological deposition in architectural and transportation coatings. Surface active PNPs may also be usefule for preparing porogens as described in U.S. Pat. No. 6,271,273.

In one embodiment of the present invention a paper coating composition containing a polymer dispersed in an aqueous medium such as an emulsion polymer is admixed with functionalized PNPs. The dry coating formed from the coating composition exhibits improved ink receptivity and/or print permanance including, for example, water resistance, offset resistance, and smear resistance relative to the same composition absent the functionalized PNPs. The coated paper can be preferably used as a substrate for inkjet printing.

In one embodiment of the present invention, a coating composition containing PNPs having been infused with a functional agent such as, for example, an agronomically active ingredient, and an antistatic agent, the agent being substantially insoluble in the medium of the coating composition, is provided. The dry coating formed from the coating composition exhibits a controlled release rate of the functional agent to the surface of the coating, the rate influenced in part by the glass transition temperature of the PNP.

In one embodiment of the present invention a composition containing PNPs having been infused with a functional agent such as, for example, a lubricant or a silicone is provided. The modified PNPs exhibit deposition on and the functional agent exhibits distribution on a textile material during a wash and dry laundering cycle.

In one embodiment of the present invention a composition containing PNPs having been infused with a functional agent such as, for example, a lubricant or a silicone is provided. The modified PNP is used in a personal care application such as a shampoo or a lotion.

In one embodiment, there is provided a method for forming a polymeric dispersion. The polymeric dispersions of this embodiment are provided by forming PNPs, providing a reaction mixture comprising the PNPs and at least one monomer, and subjecting the reaction mixture to at least one bulk, solution, gas-phase, emulsion, mini-emulsion, or suspension polymerization condition. In this embodiment, the PNPs are dissolved or dispersed in a monomer or monomer mixture and used in a subsequent polymerization for preparing polymeric dispersions. Any monomers that can be polymerized can be used, and preferably are ethylenically unsaturated monomers. While the PNPs used in the present invention can be incorporated in any type of polymerization, including emulsion, mini-emulsion, bulk, solution, gas-phase, suspension, and combinations thereof, preferred types of subsequent polymerizations include, suspension polymerizations, mini-emulsion polymerizations, micro-emulsion polymerizations, and emulsion polymerizations to provide polymeric dispersions.

While any amount of PNPs can be used for preparing polymeric dispersions, it is preferred to employ levels of 1 to 90 percent, preferably 1 to 75 percent, more preferably 1 to 50 percent, even more preferably 1 to 30 percent PNPs, and even further preferably 1 to 20 percent by weight PNPs based on monomer weight.

Hydrophilic PNPs are favored for preparing polymeric dispersions which use emulsion polymerization techniques. One example of a hydrophilic PNP is one containing polymerized units of 50 MMA/20 BA/10 DEGDMA/20 PEGMEMA475, wherein the number preceding the monomer designation refers to the weight fraction of the polymerized units. Preferred PNPs are not highly soluble in water in the case of mini-emulsion and dispersion polymerization. The PNPs in the polymeric dispersions can be interacting or non-interacting with the later-formed polymer. Interactions can include, for example, covalent bonding, acid/base interaction, and charge transfer interaction. For use in aqueous-based polymerizations, the PNPs are preferably dispersed in water or a water/solvent mixture. PNPs included in such polymeric dispersions can provide a broader accessible range of composition than could be attained by direct formation of a comparative polymer particle formed by emulsion or suspension polymerization, i.e., compositions too hydrophobic or too hydrophilic for direct polymerization can be introduced by adding PNPs formed by solution polymerization. The particle dispersions are incorporated into a coating composition and the coating formed therefrom exhibits at least one improved property. The particle dispersions can also be used to form polymeric composites.

In one embodiment of the present invention, PNPs can be dissolved or dispersed in a monomer or monomer mixture and used in a subsequent polymerization for preparing polymeric composites. The monomers used can be any monomer mixture useful for forming polymeric materials, and are preferably ethylenically unsaturated. Any type of polymerization, including emulsion, mini-emulsion, bulk, solution, gas-phase, suspension, and combinations thereof, are useful for preparing the polymeric composites.

While any amount of PNPs can be used for preparing the polymeric composites, it is preferred to employ levels of 1 to 90 percent, preferably 1 to 75 percent, more preferably 1 to 50 percent, and even more preferably 1 to 30 percent PNPs by weight based on monomer weight. The polymeric composites can also be provided using the method of preparing polymeric dispersions as described in the previous embodiment.

In one embodiment of the present invention, PNPs are used in emulsion polymerization processes for improving the properties (e.g., improved stability) of the resulting emulsion polymer particle dispersion. In this embodiment, improved stability refers to reducing the likelihood that the emulsion polymer particles destabilize and become undispersed, i.e., by flocculation, agglomeration, gel formation, and like processes whereby two or more polymer particles interact. The PNPs are useful as stabilizers for aqueous-based emulsion polymerizations and aqueous-based polymer dispersions. In this embodiment, the PNPs contain acid or other functionalities that are hydrophilic. Preferably, the PNPs are prepared using an acid-containing monomer. It is also preferred that the acid content is sufficiently high to provide an electrostatic charge layer around the PNPs. Acid contents of suitable PNPs useful as stabilizers can be estimated by the acid contents of typical "high acid" polymers which are known to act as stablizers for emulsion polymerizations, e.g., as described in U.S. Pat. No. 4,845,149.

Typically, PNPs which are useful as stabilizers for aqueous dispersions, such as emulsion polymerizations, contain units derived from 1 to 99 weight percent, preferably from 5 to 95 weight percent, more preferably from 8 to 75 weight percent, even more preferably from 15 to 60 weight percent, and further more preferably from 20 to 40 weight percent of at least one acid-containing monomer or acid-forming agent. While any acid-containing monomer can be used, it is typical that the acid-containing monomer is copolymerizable by free radical polymerization. Among such acid-containing monomers, acrylic acid and methacrylic acid are preferably used. Typically, the PNPs which are useful as stabilizers contain units derived from 1 to 50 weight percent, preferably from 2 to 40 weight percent, more preferably from 3 to 20 weight percent, and even more preferably from 5 to 15 weight percent of at least one multi-ethylenically-unsaturated monomer. Preferably, the acid functionalities of the PNPs are neutralized with a suitable neutralizing base, such as hydroxides (e.g., sodium hydroxide, potassium hydroxide), amines, and preferably ammonia. More preferably, such PNPs are prepared in an aqueous-compatible solvent, neutralized with a base, and diluted in water prior to carrying out the emulsion polymerization. Even more preferably, the aqueous-compatible solvent is at least partially removed, and most preferably substantially completely removed, from the PNP dispersion when used to stabilize emulsion polymerizations.

While such PNP stabilizers need only contain acid monomers and multi-ethylenically-unsaturated monomers as provided hereinabove, it should be appreciated that the PNPs can optionally contain up to 85 weight percent of units derived from other ethylenically unstaturated monomers which are not acid-containing and not multi-ethylenically-unsaturated monomers. Similarly, the PNPs useful as stabilizers may also contain optional functional monomers including, but not limited to, such functionalities as hydroxyl, acetoacetate, acrylamides, acrylamide/formaldehyde adducts, ureido, amine, and the like.

The PNPs of the present invention can be used as stabilizers (i.e., dispersants) in emulsion polymerizations according to the methods known for using "high acid" polymeric stabilizers (often referred to as "resin supported emulsion polymerization", see for example U.S. Pat. No. 4,845,149 and U.S. Pat. No. 6,020,061). Ranges for use of PNPs as dispersants in emulsion polymerization are as follows: 5 to 80, preferably 10 to 60, most preferably 15 to 40 weight percent PNPs based on total weight of the PNPs and the emulsion polymer solids.

Among suitable emulsion polymer compositions, any emulsion polymer, copolymer, multi-stage copolymer, interpolymer, core-shell polymer, and the like can be stabilized using the PNPs of the the present invention. While any ethylenically unsaturated monomer may be used, it is preferred that the emulsion polymers which are stabilized are prepared from at least one of (meth)acrylic ester and vinylaromatic monomers.

In carrying out emulsion polymerizations containing the PNP stabilizers of the present invention, all of the typical emulsion polymerization components, conditions, and processes can be used, e.g., any known emulsion polymerization emulsifier (soap) may be present (or even absent), initiators, temperatures, chain transfer agents, reactor types and solids content, and the like. Improvements in coatings prepared with emulsion polymers having PNP stabilizers are expected in the following properties: paint open time, gloss, controlled rheology, stability, water resistance, block resistance, heat seal resistance, and dirt pickup resistance.

In one embodiment of the present invention, blends of emulsion polymer latex particles with PNP stabilizers are envisioned, while emulsion polymer latex particles prepared with PNPs as stabilizers are preferred.

In one embodiment, PNPs containing residual unsaturation are subsequently treated with additional monomer(s) under polymerization conditions to form PNPs including at least one second stage polymer. The second stage polymer can exhibit functional behavior such as adhesion promotion, waterproofing such as is afforded by amphiphilic polymers as are disclosed in U.S. Pat. No. 5,330,537. The second stage polymer can also exhibit surface active behavior by incorporating surface active monomers. The composite PNPs are incorporated into a coating composition and the coating formed therefrom exhibits at least one improved property.

In one embodiment, a coating is used as a leather treatment to provide a tanning process for tanning and retanning leather. A process to tan skins whereby the skins are drummed in the pH range of 3 to 7 (preferably 3.5 to 4.5) in a buffered aqueous solution containing PNPs is provided. In this embodiment, it is preferred that the buffered aqueous solution comprises of sodium acetate and acetic acid, preferably in a 1:1 ratio. A tanned leather is thus obtained that is fully functional. At the end of its service life, this leather can be disposed of by burning, and/or buried and or/landfilled with little or no detriment to the quality of the environment. In such environmentally-friendly tanning processes, the PNPs preferably contain less than 1 weight percent halogen atoms, more preferably less than 0.5 weight percent halogen atoms, even more preferably less than 0.2 weight percent halogen atoms, and most preferably less than 0.1 weight percent halogen atoms. It is also readily digested by chemical and enzymatic means to amino acids for use as fertilizer and/or animal feed.

In one embodiment PNPs dispersed in a solvent can be used as a medium to prepare a hot-tube oligomer and permit isolation of a 100% solids oligomer/PNP together. This provides PNPs in a "solvent" of oligomer. The PNPs will be relatively high in molecular weight but as a dispersed phase may not contribute much to the overall viscosity. For reaction with a polyisocyanate, for example, hydroxyl content of the PNPs can be desirably lower than that of the oligomer. Similarly, other crosslinking chemistries including, for example, epoxy-amine or carboxylate, uv/eb cure (acrylated oligomer), and others can be based on oligomer/PNP blends.

In one embodiment, an aqueous coating composition containing an associative thickener and PNPs and, optionally, an emulsion polymer binder, pigment, and/or other paint adjuvants, provides greater thickening efficiency than the same composition absent the PNPs. Various associative thickeners are know in the art and can be used with PNPs in the present invention. Preferred associative thickeners include at least one of the following types: a "hydrophobically-modified polyurethane, a hydrophobically-modified alkali-soluble emulsion, a hydrophobically modified hydroxy ethyl cellulose, a hydrophobically modified polyvinylalcohol, and a hydrophobically modified polyacrylamide, and variations thereof. The weight percentage of the associative thickener and the PNP will preferably be at least 0.02, more preferably at least 0.05, and even more preferably at least 0.1 based on the total weight of the aqueous coating composition. Typically, the ranges of weight ratios of the PNP to the associative thickener will be 1-99:99-1, preferably 5-95:95-5; more preferably 10-90:90-10, even more preferably 20-80:80-20, even further preferably 30-70:70-30, and most preferably 40-60:60-40. Typically, the weight percentage of the associative thickener and the PNP will be at most 20, preferably at most 10, and even more preferably at most 5 weight percent based on total weight of the aqueous coating composition. The viscosity of the aqueous coating composition will be at least 0.2 Poise, preferably at least 0.5 Poise, more preferably at least 1 Poise, and even more preferably at least 2 Poise. Typically, the viscosity of the aqueous coating composition will be at most 50 Poise, preferably at most 20 Poise, and more preferably at most 10 Poise. Without being bound by mechanism, it is believed that the PNPs can provide additional sites for bridging by the associative thickener.

The following examples are presented to illustrate further various aspects of the present invention.

EXAMPLE 1

Preparation of PNPs

A 500 mL reactor was fitted with a thermocouple, a temperature controller, a purge gas inlet, a water-cooled reflux condenser with purge gas outlet, a stirrer, and an addition funnel. To the addition funnel was charged 201.60 g of a monomer mixture consisting of 18.00 g methyl methacrylate (100% purity), 2.00 g diethyleneglycol dimethacrylate (100% purity), 1.60 g of a 75% solution of t-amyl peroxypivalate in mineral spirits (Luperox 554-M-75), and 180.00 g diisobutyl ketone ("DIBK"). The reactor, containing 180.00 g DIBK was then flushed with nitrogen for 30 minutes before applying heat to bring the contents of the reactor to 75° C. When the contents of the reactor reached 75° C., the monomer mixture in the addition funnel was uniformly charged to the reactor over 90 minutes. Thirty minutes after the end of the monomer mixture addition, the first of two chaser aliquots, spaced thirty minutes apart and consisting of 0.06 g of a 75% solution of t-amyl peroxypivalate in mineral spirits (Luperox 554-M-75) and 2.00 g DIBK, was added. At the end of the second chaser aliquot, the contents of the reactor were held 21/2 hours at 80° C. to complete the reaction. The resulting polymer was isolated by precipitation with heptane, collected by filtration and dried under vacuum to yield a white powder. This material was redissolved in propyleneglycol monomethylether acetate. The PNPs thus formed had a particle size distribution of from 0.8 to 5.0 nm with mean of 1.4 nm as determined by dynamic laser light scattering, and an apparent molecular weight of 22,642 g/mol with a number average molecular weight of 14,601 g/mol and Mw/Mn distribution of 1.6 as measured by GPC.

EXAMPLE 2

Preparation of PNPs, a AAEM/ALMA Copolymer by a Semi-batch Emulsion Polymerization Process A monomer emulsion was made from a mixture of 17 g deionized water, 8.85 g of 28% w/w solids ammonium lauryl sulfate ("ALS"), 12.4 g acetoacetoxyethyl methacrylate ("AAEM"), and 1.78 g allyl methacrylate ("ALMA"). A reaction kettle was then prepared with 600 g deionized water, 15.0 g of 28% w/w solids ALS, and 0.15 g ammonium persulfate ("APS") in 1 mL deionized water. The reaction kettle was heated to 90° C. while being purged with nitrogen. One half of the monomer emulsion was added to the reaction kettle with stirring at 200 rpm. After 20 minutes, the remaining monomer emulsion was added. The kettle temperature was kept at 90° C. for 30 minutes, cooled to 55° C., and then a solution of 0.02 g t-butyl hydroxy peroxide ("t-BHP") in 1 mL of deionized water and a solution of 0.010 g sodium sulfoxylate formaldehyde ("SSF") in 1 mL of deionized water were added respectively. The reaction was then cooled to ambient temperature and the emulsion was filtered through 400 and 100 mesh sieves respectively.

The sample was isolated from water by freeze-drying to produce a white friable, free flowing powder. The resulting white powder was washed with copious amounts of doubly distilled and deionized water to remove most of the surfactant.

EXAMPLE 3

Preparation of PNPs—AAEM/ALMA Copolymer Prepared by a Batch Emulsion Polymerization Process A monomer emulsion was made from a mixture of 17 g deionized water, 8.85 g of 28% w/w solids ALS, 12.4 g AAEM, and 1.78 g ALMA in a bottle. A reaction kettle was then prepared with 600 g deionized water, 15.0 g of 28% w/w solids ALS, and 0.15 g APS in 1 mL deionized water. The reaction kettle was heated to 90° C. while being purged with nitrogen. The monomer emulsion was added all at once to the reaction kettle with stirring at 200 rpm. After 30 minutes, the temperature of the reaction flask was cooled to 75° C., and then a solution of 0.02 g t-BHP in 1 mL of deionized water was added. The reaction was cooled further to 55° C, and a solution of 0.010 g SSF in 2 mL of deionized water was added. The reaction was cooled to ambient temperature and the emulsion was filtered through 400 and 100 mesh sieves respectively.

EXAMPLE 4

Preparation of PNPs Prepared by a Gradual-addition Polymerization Process

A monomer emulsion was made from a mixture of 100 g water, 1.60 g of 28% w/w solids ALS, 68 g ethyl acrylate ("EA"), 17 g methyl methacrylate ("MMA"), 12.5 g divinyl benzene ("DVB"), and 5 g methacrylic acid ("MAA"). A reaction kettle containing 445 g water, 22.2 g of 28% w/w solids ALS and 0.37 g APS was heated to 85° C. under a nitrogen atmosphere. The monomer emulsion was fed to the kettle over 90 minutes. The reaction was held at 85° C. for 30 minutes after the end of the feed, and then cooled to 65° C. After cooling, 1.33 g of 10% iron sulfate ($FeSO_4$) was added. After 1 minute, 0.2 g of 70% t-BHP was added and after 2 minutes 0.10 g of 100% isoascorbic acid ("IAA") and the reaction held for 15 minutes. A second chaser system was added in the same sequence and over the same time period. The reaction was then cooled to ambient temperature and filtered through a 400 mesh sieve.

EXAMPLE 5

Preparation of Various PNPs

PNP compositions are reported in Table 5.1. These polymers were prepared according to the general procedures of Examples 1–4. The abbreviation "Mw" refers to the weight average molecular weight and the term "Mn" refers to the number average molecular weight. The term "Dist" refers to the ratio of Mw/Mn. The apparent molecular weights were measured using a standard GPC method with tetrahydrofuran as the solvent.

TABLE 5.1

Polymeric PNP compositions

| Sample 5- | Composition | Ratio | Mw | Mn | Dist |
|---|---|---|---|---|---|
| 1 | HEMA/DEGDMA | 90/10 | | | |
| 2 | MMA/DEGDMA | 90/10 | | | |
| 3 | MMA/DEGDMA | 90/10 | 19073 | 11183 | 1.7 |
| 4 | MMA/DEGDMA | 90/10 | 644 | 221 | 2.9 |
| 5 | MMA/DEGDMA | 90/10 | 771 | 3989 | 1.9 |
| 6 | MMA/MAPS/DEGDMA | 70/20/10 | 10640 | 4254 | 2.5 |
| 7 | MMA/MAPS/DEGDMA | 80/10/10 | 12819 | 8091 | 1.6 |
| 8 | MMA/MAPS/DEGDMA | 60/30/10 | | | |
| 9 | MMA/MAPS/DEGDMA | 40/50/10 | 43667 | 9047 | 4.8 |
| 10 | MMA/MAPS/DEGDMA | 20/70/10 | 166432 | 7404 | 22.5 |
| 11 | MAPS/DEGDMA | 90/10 | 11683 | 3484 | 3.4 |
| 12 | MMA/MAPS | 88.9/11.1 | 15965 | 7424 | 2.2 |
| 13 | BA/DEGDMA | 90/10 | 51007 | 29065 | 1.8 |
| 14 | MMA/MAPS/PETTA | 80/10/10 | | | |
| 15 | MMA/MAPS/ PPG4000DMA | 80/10/10 | | | |
| 16 | MMA/MAPS/DPEPA | 80/10/10 | | | |
| 17 | MMA/MAPS/TMPTMA | 80/10/10 | | | |
| 18 | MMA/MAPS/DEGDMA | 75/10/15 | | | |
| 19 | MMA/MAPS/DEGDMA | 85/10/5 | | | |
| 20 | MMA/MAPS/DVB | 10/60/30 | 95613 | 12003 | 8.0 |
| 21 | MMA/MAPS/DVB | 20/60/20 | 110422 | 19814 | 5.6 |
| 22 | MMA/MAPS/DVB | 25/60/15 | | | |
| 23 | MMA/MAPS/DVB | 30/60/10 | | | |
| 24 | MMA/MAPS/DEGDMA | 20/70/10 | 35249 | 7438 | 4.7 |
| 25 | MMA/MAPS/DEGDMA | 30/60/10 | 35105 | 7003 | 5.3 |
| 26 | MMA/MAPS/DVB | 10/80/10 | 331732 | 29918 | 11.1 |
| 27 | STY/MAPS/DVB | 30/60/10 | 38455 | 12320 | 3.1 |
| 28 | BA/MAPS/DVB | 30/60/10 | 499094 | 36317 | 13.7 |
| 29 | BA/MAPS/DVB | 10/80/10 | 312848 | 16102 | 19.4 |
| 30 | BA/TMSMA/DVB | 10/80/10 | 674730 | 30989 | 21.8 |
| 31 | BA/MOPTSOMS/DVB | 10/80/10 | 97530 | 12154 | 8.0 |
| 32 | BA/MOPMDMOS/DVB | 10/80/10 | 363561 | 37553 | 9.7 |
| 33 | BA/MAPS/TAT | 10/80/10 | 12201 | 5182 | 2.4 |
| 34 | ALMA/BA/DVB | 10/80/10 | | | |
| 35 | IBOMA/MAPS/DVB | 10/80/10 | | | |
| 36 | BA/DVB | 90/10 | 223436 | 29309 | 7.6 |
| 37 | BA/PGDMA | 90/10 | 26797 | 8242 | 3.3 |
| 38 | BA/ALMA | 90/10 | 104529 | 15967 | 6.5 |
| 39 | BA/TMPTMA | 90/10 | 39638 | 16306 | 2.4 |
| 40 | BA/DPEPA | 90/10 | 103945 | 18702 | 5.6 |
| 41 | EHA/DVB | 90/10 | | | |
| 42 | EHA/ALMA | 90/10 | | | |
| 43 | EHA/TMPTMA | 90/10 | | | |
| 44 | EHA/DPEPA | 90/10 | | | |
| 45 | STY/DVB | 90/10 | | | |
| 46 | STY/ALMA | 90/10 | | | |
| 47 | EHA/STY/ALMA | 20/70/10 | | | |
| 48 | EHA/STY/ALMA | 45/45/10 | | | |
| 49 | MMA/DEGDMA | 90/10 | 22642 | 14601 | 1.6 |

EXAMPLE 6

Suspension Polymerization Incorporating PNPs

| Material | Charge Weight (grams) |
|---|---|
| Solution #1 | |
| D.I. water | 67.10 |
| Pharmagel | 4.75 |
| Solution #2 | |
| D.I. water | 414.00 |
| Padmac | 21.30 |
| NaCl | 93.30 |
| Monomer/PNP Mix | |
| MMA | 333.00 |
| PNP | 16.65 |
| Benzoquinone | 0.018 |
| Lauryl Peroxide | 3.30 |
| Post-Reaction Additive | |
| Triton CF-32 | 3 drops |

PNPs of composition 80 BA/10 MMA/10 DEGDMA are prepared in MIBK at a solids level of 5%. A 1000 g sample of this composition is placed in a 2 liter flask and the MIBK removed under reduced pressure utilizing a rotary evaporator. Solution #1 is prepared in a beaker and heated to 60° C. with stirring until Pharmagel is fully dissolved. Solution #2 is stirred at room temperature in a beaker until the Padmac and NaCl are fully dissolved. Then, solution #1 is added to solution #2 with stirring. Then, the monomer mixture is made by placing 333.00 g of methyl methacrylate in a beaker along with 0.018 g of benzoquinone and 3.30 g of lauryl peroxide; this mixture is stirred for 20 minutes at room temperature to allow for complete dissolution of the benzoquinone and lauryl peroxide. The Padmac/Pharmagel mixture is then added to the reactor and stirred for 10 minutes at 245 rpm. The monomer/PNP mixture is then added in order to form a monomer dispersion within the reactor. The reactor temperature is then raised to 65° C. over one hour in order to initiate polymerization of the monomer. The temperature is allowed to reach 74° C. and then maintained at that temperature by the addition of cold water. Upon completion of the exotherm, the temperature is maintained at 74° C. for 15 minutes. Then, 0.6 mL of Triton CF-32 is added to the reactor, and the temperature is raised to 90° C. for two hours. Finally, the reactor is cooled to room temperature, and the product is collected by filtration.

EXAMPLE 7

Preparation of Suspension Polymer

The process of Example 6 is repeated except that PNPs of composition 54 MMA/36 BA/10 DEGDMA prepared in MIBK at a solids level of 5% are used.

COMPARATIVE EXAMPLE A

Preparation of Suspension Polymer

| Material | Charge Weight (grams) |
|---|---|
| Solution #1 | |
| D.I. water | 67.10 |
| Pharmagel | 4.75 |

-continued

| Material | Charge Weight (grams) |
|---|---|
| Solution #2 | |
| D.I. water | 414.00 |
| Padmac | 21.30 |
| NaCl | 93.30 |
| Monomer Mix | |
| MMA | 333.00 |
| Benzoquinone | 0.018 |
| Lauryl Peroxide | 3.30 |
| Post-Reaction Additive | |
| Triton CF-32 | 3 drops |

Solution #1 is prepared in a beaker and heated to 60° C. with stirring until Pharmagel is fully dissolved. Solution #2 is stirred at room temperature in a beaker until the Padmac and NaCl are fully dissolved. Then, solution #1 is added to solution #2 with stirring. Then, the monomer mixture is made by placing 333.00 g of methyl methacrylate in a beaker along with 0.018 g of benzoquinone and 3.30 g of lauryl peroxide; this mixture is stirred for 20 minutes at room temperature to allow for complete dissolution of the benzoquinone and lauryl peroxide. The Padmac/Pharmagel mixture is then added to the reactor and stirred for 10 minutes at 245 rpm. The monomer mixture is then added in order to form a monomer dispersion within the reactor. The reactor temperature is then raised to 65° C. over one hour in order to initiate polymerization of the monomer. The temperature is allowed to reach 74° C. and then maintained at that temperature by the addition of cold water. Upon completion of the exotherm, the temperature is maintained at 74° C. for 15 minutes. Then, 0.6 mL of Triton CF-32 is added to the reactor, and the temperature is raised to 90° C. for two hours. Finally, the reactor is cooled to room temperature, and the product is collected by filtration.

EXAMPLE 8

Preparation of Mini-emulsion of Polymer/PNP Composite

PNPs of composition 90 MMA/10 DEGDMA are prepared in MIBK at a solids level of 5%. A 1000 g sample of this composition is placed in a 2 liter flask and the MIBK removed under reduced pressure utilizing a rotary evaporator.

| Component | Amount (g) |
|---|---|
| BA | 20.9 |
| MMA | 13.9 |
| PNP | 1.05 |
| DI Water | 144.4 |
| Sodium Lauryl Sulfate (SLS) | 0.62 |
| Hexadecane | 1.5 |
| Potassium Persulfate (KPS) | 0.0705 |
| Sodium Bicarbonate | 0.021 |

The above mixture is placed in a reactor and homogenized for a period of 30 minutes in order to obtain a stable mini-emulsion. Then, the temperature is raised to 75 C for two hours in order to polymerize the styrene monomer. Upon cooling to room temperature, the material is filtered and characterized.

EXAMPLE 9

Preparation of Mini-emulsion of Polymer/PNP Composite

A mini-emulsion is prepared according to the process of Example 8 with the exception that PNPs of composition 54 MMA/26 BA/10 DMAPMA/10 DEGDMA prepared in MIBK at a solids level of 5% is used.

COMPARATIVE EXAMPLE B

Mini-emulsion Polymer Latex without PNPs

| Component | Amount (g) |
|---|---|
| Styrene | 34.8 |
| DI Water | 144.4 |
| Sodium Lauryl Sulfate (SLS) | 0.62 |
| Hexadecane | 1.5 |
| Potassium Persulfate (KPS) | 0.0705 |
| Sodium Bicarbonate | 0.021 |

The above mixture is placed in a reactor and homogenized for a period of 30 minutes in order to obtain a stable mini-emulsion. Then, the temperature is raised to 75° C. for two hours in order to polymerize the styrene monomer. Upon cooling to room temperature, the material is filtered and characterized.

EXAMPLE 10

Emulsion Polymerization to Form Polymer/PNP Composite

PNPs of composition 50 MMA/20 BA/10 DEGDMA/20 PEGMEMA475 is prepared in MIBK at a final solids level of 5%. A 1000 g sample of these PNPs are placed in a 2 liter flask and the MIBK removed under reduced pressure utilizing a rotary evaporator. To this is added 335 g MMA and 600 g BA—the mixture is stirred until it appeared homogenous.

A 3 liter, four-neck, round bottom glass flask is equipped with a mechanical blade stirrer, a thermocouple to monitor temperature, a reflux condenser, a means to heat and cool, and a nitrogen atmosphere. The flask is charged with 400 g DI water and is heated to 85° C. A monomer pre-emulsion is prepared from 280 g DI water, 11 g sodium dodecylbenzene sulfonate (23% aqueous solution), the monomer/PNP mixture formed above and 15 g AA. The reaction flask is charged with 4 g ammonium persulfate dissolved in 20 g DI water and 16 g (solids basis) of a 100 nm seed latex with a total of 29 g of DI water. The pre-emulsion and 1.5 g ammonium persulfate dissolved in 45 g DI water were added over three hours. Heating and cooling were applied as necessary to maintain the reaction temperature at 83° C. When the additions are complete, 30 g DI water is used to rinse the pre-emulsion container into the flask. After 30 minutes, the flask is cooled to 60° C. Once a temperature of 55° C. is reached through cooling, 0.008 g of $FeSO_4 \cdot 7H_2O$ dissolved in 5 g DI water is added, followed by 0.40 g of 70% aqueous tert-butyl hydroperoxide in 45 g DI water and 0.25 g of sodium formaldehyde sulfoxylate dissolved in 45 g DI water added drop-wise over one hour. The reaction mixture is cooled to 45° C. and the pH is adjusted with 14 g 14% aqueous ammonia. After cooling to room temperature the emulsion polymer is filtered. The emulsion polymer of this example has a composition of 60 BA/33.5 MMA/5 PNP/1.5 AA.

COMPARATIVE EXAMPLE C

Preparation of Emulsion Polymer without PNPs

The process of Example 3 is repeated without PNPs. Coatings containing the polymers of Examples 6–7, 8–9, and 10 including PNPs having a mean particle diameter of 1 to 100 nanometers are expected to exhibit at least one of: higher strength, lower tack, better block and better film formation relative to coatings of otherwise the same composition containing the polymers of Comparative Examples A, B, and C, respectively.

EXAMPLE 11–A

Leather Treatment (Tanning) with PNP Composition

PNP T is a 15% (90 EUG/10TMTPA) in cyclohexanone. It has a measured average particle size of 1.5 nanometers. All percentages are based on the weight of pickled stock.

Pickled stock of 1.2 mm thickness from a local tannery is neutralized using a conventional process. A piece of the pickled stock (100 G.) is put in a 1 gallon glass jar and is floated with 200% of a 5% sodium chloride aqueous solution. The jar is sealed and is its contents tumbled at room temperature in a rotating paint-can mixer for 15 minutes to wash the stock. The wash float is decanted and its pH measured to be ~3.5. The flaccid pickled stock in the glass jar is next floated with a fresh offer of 100% of 5% salt solution and to this system is added 2% anhydrous sodium acetate. The jar is sealed and the system is tumbled continuously for 4 hours to neutralize the pelt. After this time the float has a pH of ~4.5 and indicates that it embodies a 1:1 buffer of acetic acid and sodium acetate. The shrink temperature of the neutralized pelt is measured using a standard test method, and is found to be a typical 60 Celsius. To the jar is then added PNP T (50 g), and an additional 50% of the 5% salt solution. The jar is sealed and is manually shaken to quickly homogenize the contents. A foamy three phase system is observed akin to that tanners get when wet skins are degreased with kerosene. The glass jar and its contents are then tumbled at room temperature for 24 hours in the paint can mixer. After this time, the tumbling is stopped. The pelt is pulled out of the jar. It has a rigid/full bodied handle and its thickness is measured at 1.8 millimeters to signify a filling ability of the tanning treatment. The shrink temperature of the treated pelt is evaluated and is measured at 93° C. This high shrink temperature signifies that PNP T transforms the pelt to a stable leather and hence demonstrates the tanning ability of PNP T. The leather is then cut into 2 equal parts. One part is split along its plane into 2 sheets of equal 0.9 millimeter thickness using conventional means. No problems of gumming and operational irregularities are experienced. The 3 leathers are air dried. Each has a white/opaque color, is quite flexible, and is fully agreeable aesthetically to signify its good potential to make articles of commerce like shoes and upholstered furniture. The spent two phase tanning liquor above is analyzed as follows to determine the residual content of the PNP tanning agent. It is put in a 250 milliliter separatory funnel and the top cyclohexanone layer is collected. It is washed once with an equal amount of de-ionized water to remove residual acetic acid. It is then dried over anhydrous Magnesium Sulfate. An aliquot of this cyclohexanone solution (20 G.) is taken to dryness in an oven heated to 60° C. The weight of the residue is 1 g. This residue is analyzed by HPLC and its identity determined to be predominantly natural animal grease/fat. Thus the uptake of PNP T by the pelt is substantially 100%.

EXAMPLE 11–B

100% Solids Polyurethane Adhesive

A premix of PNP dispersion, monomer and initiator is prepared as follows:

| | |
|---|---|
| PNP (85 BA/15 HEA, 10 nm particles, 15% in acetone) | 1000 g |
| Butyl acrylate | 255 g |
| Hydroxyethyl acrylate | 45 g |
| Di(tert-butyl) peroxide | 5.7 g |

The mixture is submitted to polymerization conditions in a tubular reactor at 250 C and 3500 psi according to the procedure described in EP 1010706. The product solution in acetone is stripped in a wiped-film evaporator to afford a 100% "solids" dispersion of 10 nm PNP polyol in the oligomer polyol "solvent". The resulting polyol composition is used in place of conventional polyether polyol, polyester polyol or acrylic polyol in 2-part polyisocyanate-cure adhesives or coatings. The resulting coating compositions are expected to be lower in viscosity prior to application than comparative systems and provide improved strength after cure due to the reinforcing effect of the PNPs.

EXAMPLE 11–C

Coating Composition Exhibiting Enhanced Thickening Effect

ACRYSOL RM-825 (associative thickener, Rohm and Haas Company) requires 2 wt % to provide a viscosity of 5 Poise to water. A mixture containing 50 wt % RM-825 solids and 50 wt % of PNPs with a mean diameter of 4 nm (40% BA, 40% MMA and 10 trimethylolpropane triacrylate) provides a viscosity of 5 Poise with only 0.2 wt % of the mixture added to water. In addition to high efficiency in aqueous formulations the mixture of this invention is also less sensitive to variations in the aqueous formulation.

EXAMPLE 12

The PNPs described in the following table were prepared in MEK (15–21 percent solids) having surface active monomer (F or Si containing monomers) according to the synthetic methods described according to the general procedures in Examples 1 to 4.

| | PNP Monomeric Unit Composition, Weight Percent | | | | | |
|---|---|---|---|---|---|---|
| PNP | OFPMA | MATS | BA | MMA | TMPTMA | PS, mean |
| 12-a | 5 | | 51 | 34 | 10 | 5.2 nm |
| 12-b | 10 | | 48 | 32 | 10 | 5.9 nm |
| 12-c | 20 | | 70 | | 10 | 3.7 nm |
| 12-d | | 30 | 60 | | 10 | 4.6 nm |

Polymer films were prepared by combining PARALOID B-82 (a low-acid containing acrylic obtainable from Rohm and Haas Company) with each of these PNPs dispersed in MEK, diluting with MEK or acetone, and casting and drying films on substrates. The distribution of surface active F and Si, as measured by VG-XPS, at the surface of the films, is recorded in the following Table.

| Film # | PNP #/diluting solvent | Weight Percent F or Si in Total Coating | Atomic Composition (weight percent) Measured at Film Surface F | O | C | Si |
|---|---|---|---|---|---|---|
| 12-A | none/MEK (Reference) | 0.000 | 0.0 | 37.9 | 62.1 | 0.0 |
| 12-B | 12-a/MEK | 0.025 | 2.4 | 35.2 | 62.4 | 0.0 |
| 12-C | 12-b/MEK | 0.051 | 6.1 | 33.9 | 60.0 | 0.0 |
| 12-D | 12-c/MEK | 0.101 | 14.3 | 29.1 | 56.6 | 0.0 |
| 12-E | 12-d/MEK | 0.034 | 0.0 | 35.4 | 62.1 | 2.5 |
| 12-F | none/acetone (Reference) | 0.000 | 0.0 | 37.9 | 62.1 | 0.0 |
| 12-G | 12-a/acetone | 0.025 | 2.7 | 36.1 | 61.2 | 0.0 |
| 12-H | 12-b/acetone | 0.051 | 4.2 | 36.1 | 59.7 | 0.0 |
| 12-I | 12-c/acetone | 0.101 | 11.1 | 32.3 | 56.6 | 0.0 |
| 12-J | 12-d/acetone | 0.034 | 0.0 | 35.3 | 62.2 | 2.5 |

The results in this table indicate that the surface concentration of the active elements, and therefore that of the PNPs, is considerably higher than would be expected if the PNPs were uniformly distributed throughout the matrix of the film.

EXAMPLE 13

Testing Films for Resistance to Algae Growth

Films of the MEK diluted films of Example 12 were prepared on microscope slides and suspended in 4 oz jars with 90 ml growth medium (Alga-Gro Freshwater Medium from Carolina Biological Supply Company). The growth medium was inoculated with 10 ml of unidentified green algal culture obtained from a fish tank. The algae demonstrated a strong ability to stick on untreated glass slides in previous tests. The films were incubated in a rotary shaker @ ~150 RPM and 30° C. under light (F20W T12CW). Observations of algal growth, expressed as percent area coverage, were made weekly for three weeks. Growth medium was periodically replaced to provide fresh nutrient for the algae. The slides were subsequently placed in a second tank and vigorously stirred under light for five additional weeks. The percent area coverage of the film by algae was measured for each film and reported in the following table.

| Film from Ex. 12 | Weight Percent F in PNPs | Percent Area Coverage of the Film by Algae Weeks of Exposure 1 | 2 | 3 | 4 | 5 | 6 | 7 | 8 |
|---|---|---|---|---|---|---|---|---|---|
| 12-A | Reference (0.000%) | 0 | 0 | 0 | 5 | 7.5 | 15 | 50 | 50 |
| 12-B | 0.025% | 0 | 0 | 0 | 10 | 15 | 15 | 20 | 25 |
| 12-C | 0.051% | 0 | 0 | 0 | 5 | 5 | 10 | 10 | 20 |
| 12-D | 0.101% | 0 | 0 | 0 | 10 | 10 | 15 | 20 | 25 |

The results in this table show that the films with surface active PNPs were more resistant to fouling than the matrix polymer absent the PNPs.

EXAMPLE 14

PNPs were prepared in MEK (15–21 percent solids) having both surface active monomer (F or Si containing monomers) and acid containing monomers (MAA or AA) as described in the following table.

| Ex. | PNP Monomeric Unit Composition, Weight Percent OFPMA | MATS | BA | MMA | MAA | AA | TMPTMA | PS, mean |
|---|---|---|---|---|---|---|---|---|
| A | 10 | | 42 | 28 | 10 | | 10 | 5.1 nm |
| B | 10 | | 42 | 28 | | 10 | 10 | 5.0 nm |
| C | | 30 | 50 | | | 10 | 10 | 4.2 nm |
| D | | 30 | 50 | | 10 | | 10 | 23.8 nm |

EXAMPLE 15

The PNPs of Example 14 were blended with non-acid containing acrylic polymer coating formulations to provide coatings having acid sites concentrated on coating surfaces for subsequent PEO grafting, but which are not water sensitive. The PNPs of Example 14 were combined with PARALOID B-82 (Rohm and Haas Company), according to the compositions described in the following table.

| Coating Composition # | PNP # | B-82 (g) | PNP (g) | MEK (g) | Wt. Ratio PNP to B-82, weight % (s/s) | Theor. μEq COOH/ slide |
|---|---|---|---|---|---|---|
| 15-A | 14-A | 12 | 1 | 10 | 3.26 | 2.44 |
| 15-B | 14-B | 12 | 1 | 10 | 3.26 | 4.29 |
| 15-C | 14-C | 12 | 1 | 10 | 3.26 | 3.65 |
| 15-D | 14-D | 12 | 1.3 | 10 | 3.19 | 4.24 |

Each coating composition (15-A, -B, -C, and -D) was drawn down on two glass slides at 25 mil wet thickness. After air drying several days, one of each slide was subjected to grafting by placing the film-covered slides into a large evaporating dish with a PEO solution:

| | | |
|---|---|---|
| DI Water | 90 g | |
| PEO 3350 | 10 g | 2990 μM |
| TEA | 18.1 mg | 179 μM |
| Diimide | 30.6 mg | 160 μM |

A large excess of PEO and ~11 fold excess of Diimide was used. Reaction was allowed to take place for 1 hour, after which the slides were rinsed in running DI Water for 1½ hrs and then another 1½ hours in still DI Water. After several hours of air drying they were placed into a RT vacuum oven overnight. The PEO-grafted and ungrafted reference coatings were tested for resistance to algae growth according to the testing procedures in Example 13. The percent area coverage of each film by Algae growth after four weeks was in the range of from 0 to 10 percent.

EXAMPLE 16 to 27

PNPs used in Emulsion Polymerizations

EXAMPLE 16

PNPs of methyl methacrylate/methacrylic acid/trimethylol propane triacrylate (70/20/10 wt. %) were prepared via solution polymerization as follows: A 5 liter reactor was fitted with a thermocouple, a temperature controller, a purge gas inlet, a water-cooled reflux condenser with purge gas outlet, a stirrer, and a monomer feed line. To a separate vessel was charged 450.00 grams of a monomer mixture (A) consisting of 315.00 gm. methyl methacrylate (MMA), 90.00 gm methacrylic acid (MAA), and 45.00 gm trimethylol propane triacrylate (TMPTA). To an additional vessel was charged an initiator mix (B) consisting of 18.00 gm. of a 75% solution of t-amyl peroxypivalate in mineral spirits (Triganox 125–C75), and 112.50 gm. isopropyl alcohol. A charge of 2325.00 gm isopropyl alcohol was added to the reactor. After sweeping the reactor with nitrogen for approximately 30 minutes, heat was applied to bring the reactor charge to 79° C. When the contents of the reactor reached 79° C., a dual feed of both the monomer mixture (A) and the initiator mix (B) to the reactor. The two mixtures were feed uniformly using feed pumps over 120 minutes. At the end of the monomer and initiator feeds, the batch was held at 79° C. for 30 minutes before adding the first of three initiator chasers consisting of 9.00 grams of a 75% solution of t-amyl peroxypivalate in mineral spirits (Triganox 125–C75), and 22.50 gm. Isopropyl alcohol. A second initiator chaser addition was made 30 minutes after the first initiator chaser addition. Similarly, the final initiator chaser addition was made 30 minutes after the second initiator chaser addition. The batch was then held at the polymerization temperature of 79° C. for and additional 2½ hours to achieve full conversion of monomer. At the end of the final hold, the batch was neutralized with a mixture of 42.5 gm of an aqueous 50% solution of $NH_4OH$ and 450.00 gm water. The neutralized polymer solution was transferred to a roto-evaporator and stripped of solvent at ~35° C. under full house vacuum. After removing all solvent the batch was further dilution with water to ~40% polymer (PNP) in water. Particle size was measured at ~5.0 nm. The resulting aqueous PNP dispersion can be used as a stabilizer for emulsion polymerizations.

EXAMPLE 17

295.3 grams of deionized water was added to a 2-liter, 4 neck round bottom flask equipped with a side arm, condenser, stirrer, and thermocouple. 160.6 grams (51.6% active in water) of ammonia neutralized acrylic acid based PNPs, pH 8–9 (70MMA/20MAA/10TMPTA, particle size less than 10 nm—prepared according to Example 16) were then added to the round bottom flask and used as a stabilizer. The flask contents was heated to 85 C under a nitrogen sweep and then 6.8 grams of a monomer mix consisting of 145.9 grams of styrene, 185.7 grams of 2-ethyl hexyl acrylate and 0.35 grams of butyl mercaptopropionate was added. Immediately after adding the 6.8 grams of monomer mix to the flask an ammonium persulfate solution (0.33 grams of ammonium persulfate dissolved in 3 grams of di-ionized water) was added to the flask and the contents of the flask is held at 85 C for 15 minutes. After the 15 minute hold an additional ammonium persulfate solution (1.0 gram of ammonium persulfate dissolved in 17.8 grams of water) was added to the flask and the remaining monomer mix is fed to the flask over 150 minutes. Sixty minutes into the monomer mix feed an ammonium persulfate cofeed solution (1.2 grams of ammonium persulfate dissolved in 29.9 grams of water) was added to the flask over 120 minutes. 140 minutes into the monomer mix feed the reaction temperature is increased to 87 C. Upon completion of the monomer mix feed the contents of the flask was held at 87 C for an additional 60 minutes. Afterwards, the contents of the flask was cooled to 25 C and filtered through a 100/325 mesh set of stacked screens, yielding a negligible quantity of coagulated polymer. The resulting filtered emulsion polymerization product had a solids content of 48.1%, pH 8.3, particle size of 700 nm and a viscosity of 1,340 cps. EXAMPLE 18–27

The PNPs listed in the following table are prepared according to the method of Example 17 and are used in emulsion polymerizations according to Example 16. Utilizing PNPs of different compositions results in different particle sized latexes and variations on the improved properties they exhibit. The resulting emulsion polymers are used for formulating coatings which have improved open time, gloss, desirable rheology, stability, water resistance, block resistance, heat seal resistance, and/or dirt pickup resistance over comparable emulsion polymerizations prepared without these PNPs.

Table of PNPs Useful as Emulsion Stabilizers

| Example | Composition | Particle Size (nm) |
|---|---|---|
| 17 | 70 MMA/20 MAA/10 TMPTA | 10 |
| 18 | 80 MMA/10 AA/10 TMPTA | 10 |
| 19 | 75 MMA/20 AA/5 ALMA | 8 |
| 20 | 35 MMA/35 BA/20 AA/10 TMPTA | 8 |
| 21 | 30 MMA/30 BA/30 AA/10 TMPTA | 10 |
| 22 | 60 BA/30 AA/10 TMPTA | 10 |
| 23 | 20 MMA/40 2-EHA/30 AA/10 TMPTA | 10 |
| 24 | 30 Sty/30 MMA/20 AA/10 TMPTA/ 10 AAEM | 10 |
| 25 | 70 MMA/20 PEM/10 TMPTA | 15 |
| 26 | 20 BA/60 AA/20 TMPTA | 15 |
| 27 | 80 AA/20 TMPTA | 20 |

What is claimed is:

1. An improved coating, comprising: a coating composition, and crosslinked polymeric nanoparticles ("PNPs") having a mean diameter of 2 to 9 nanometers, said PNPs comprising as polymerized units at least one multi-ethylenically-unsaturated monomer; wherein the PNPs comprise as polymerized units at least 10 weight percent of units derived from at least one multi-ethylenically-unsaturated monomer and at least one copolymerized unit derived from at least one of the following monomers; aldehyde-reactive group-containing monomers; drying-promoting monomers selected from ethylenically unsaturated monomers containing at least one basic amine group; surface-active monomers selected from fluoromonomers, silicon containing monomers, poly(alkylene-oxide) containing monomers; or acid-containing monomers selected from acrylic acid or methacrylic acid monomers.

2. The improved coating of claim 1, wherein the coating is in the fluid state.

3. A method for providing an improved coating, comprising the steps of:

forming crosslinked polymeric nanoparticles ("PNPs") having a mean diameter of 1 to 50 nanometers, said PNPs comprising as polymerized units at least one multi-ethylenically-unsaturated monomer;

forming a coating composition comprising said PNPs; or grafting at least one poly(alkylene oxide) molecule to the dried coating, wherein the PNPs comprise (a) at least one copolymerized unit derived from at least one of the following monomers: aidehyde-reactive group-containing monomers; drying-promoting monomers selected from ethylenically unsaturated monomers containing at least one basic amine group; surface-active monomer, selected from fluoromonomers, silicon containing monomers, or poly(alkylene-oxide) containing monomers; and at least one copolymerized unit derived from at least one acid monomer acid-containing monomers selected from acrylic acid or methacrylic acid monomers; (b) at least one copolymerized unit derived from at least one surface-active monomer selected from fluoromonomers, silicon containine monomers or poly (alkylene-oxide) containing monomers and (c) at least one copolymerized unit derived from at least one acid monomer.

4. The method for providing an improved coating according to claim 3, further comprising the steps of:

applying said coating composition to a substrate; and drying said coating composition.

5. A method for forming a polymeric dispersion, comprising the steps of:

forming crosslinked polymeric nanoparticles ("PNPs") having a mean diameter of 2 to 9 nanometers, said PNPs comprising as polymerized units at least one multi-ethylenically-unsaturated monomer;

providing a reaction mixture comprising said PNPs and at least one ethylenically unsaturated monomer; and subjecting said reaction mixture to at least one bulk, solution, gas-phase, emulsion, mini-emulsion, micro-emulsion, or suspension polymerization condition.

6. The method for forming a polymeric dispersion according to claim 5, wherein the PNPs are dispersed in an aqueous phase prior to subjecting the admixture to polymerization conditions.

7. crosslinked polymeric nanoparticles ("PNPs") comprising polymerized units of at least one multi-ethylenically-unsaturated monomer and at least one surface-active monomer selected from fluoromonomers, silicon containing monomers, or poly(alkylene-oxide) containing monomers, said PNP having a mean diameter of from 2 to 9 nanometers.

8. A polymeric composite, comprising:

crosslinked polymeric nanoparticles ("PNPs") having a mean diameter of 2 to 9 nanometers, said PNPs comprising as polymerized units at least one multi-ethylenically-unsaturated monomer; and polymers comprising as polymerized units at least one ethylenically-unsaturated monomer.

9. A method for providing an improved coating, comprising the steps of:

forming crosslinked polymeric nanoparticles ("PNPs") having a mean diameter of 2 to 9 nanometers, said PNPs comprising as polymerized units at least one multi-ethylenically-unsaturated monomer; and forming a coating composition comprising said PNPs.

10. An improved coating, comprising: a coating composition, and crosslinked polymeric nanoparticles ("PNPs") having a mean diameter of 2 to 9 nanometers, said PNPs comprising as polymerized units at least one multi-ethylenically-unsaturated monomer; wherein the PNPs comprise as polymerized units at least one copolymerized unit derived from acid-containing monomers selected from acrylic acid or methacrylic acid monomers.

* * * * *